United States Patent
Livchak et al.

(10) Patent No.: US 10,195,470 B2
(45) Date of Patent: Feb. 5, 2019

(54) WATER SPRAY FUME CLEANSING WITH DEMAND-BASED OPERATION

(71) Applicant: OY HALTON GROUP LTD., Helsinki (FI)

(72) Inventors: Andrey V. Livchak, Bowling Green, KY (US); Joe Jones, Rochester (GB)

(73) Assignee: OY HALTON GROUP LTD., Helsinki (FI)

( * ) Notice: Subject to any disclaimer, the term of this patent is extended or adjusted under 35 U.S.C. 154(b) by 598 days.

(21) Appl. No.: 14/777,402

(22) PCT Filed: Mar. 14, 2014

(86) PCT No.: PCT/US2014/027703
§ 371 (c)(1),
(2) Date: Sep. 15, 2015

(87) PCT Pub. No.: WO2014/152760
PCT Pub. Date: Sep. 25, 2014

(65) Prior Publication Data
US 2016/0030782 A1   Feb. 4, 2016

Related U.S. Application Data

(60) Provisional application No. 61/793,883, filed on Mar. 15, 2013.

(51) Int. Cl.
*A62C 3/00*   (2006.01)
*A62C 2/06*   (2006.01)
(Continued)

(52) U.S. Cl.
CPC ............... *A62C 3/14* (2013.01); *A62C 3/006* (2013.01); *A62C 37/08* (2013.01); *B01D 5/0027* (2013.01);
(Continued)

(58) Field of Classification Search
CPC ........... A62C 3/14; A62C 3/006; A62C 37/04; A62C 37/08; A62C 37/10; B01D 5/0027;
(Continued)

(56) References Cited

U.S. PATENT DOCUMENTS 3,601,099 A   8/1971   Vaillant et al.
3,630,353 A   12/1971  Seidel et al.
(Continued)

FOREIGN PATENT DOCUMENTS

CL   199802885   12/1999
CN   2070418 U   1/1991
(Continued)

OTHER PUBLICATIONS

Examination Report in corresponding British Patent Application No. 1516475.9 dated Aug. 2, 2016.
(Continued)

*Primary Examiner* — Christopher Kim
(74) *Attorney, Agent, or Firm* — Potomac Law Group, PLLC; Mark Catan

(57) ABSTRACT

A system and method is provided for demand-based control of a cold water spray system of an exhaust ventilation system. Embodiments include determining a demand load of a cooking appliance that generates cooking effluent in a vicinity of an exhaust hood, and determining a temperature of water in the cold water spray system. The cold water spray system is controlled in response to at least one of the determined appliance demand load and the determined temperature of water in the cold water spray system to maintain a low temperature of water in the cold water spray system below a predetermined temperature threshold, thereby enabling efficient removal of contaminants from the exhaust hood by the cold water spray system.

23 Claims, 4 Drawing Sheets

(51) Int. Cl.
  *B05B 7/26* (2006.01)
  *B05B 12/12* (2006.01)
  *B01D 5/00* (2006.01)
  *A62C 37/08* (2006.01)
  *F24C 15/20* (2006.01)

(52) U.S. Cl.
  CPC .............. *B05B 7/265* (2013.01); *B05B 12/12* (2013.01); *F24C 15/2021* (2013.01); *F24C 15/2057* (2013.01)

(58) Field of Classification Search
  CPC ......... B05B 7/265; B05B 12/12; B05B 12/10; F24C 15/2021; F24C 15/2057
  USPC ....................... 169/43, 45, 46, 56, 60, 61, 65
  See application file for complete search history.

(56) References Cited

U.S. PATENT DOCUMENTS

| | | |
|---|---|---|
| 3,661,201 A | 5/1972 | Bash et al. |
| 3,664,255 A | 5/1972 | Kuechler |
| 3,690,245 A | 9/1972 | Ferlise et al. |
| 3,717,129 A | 2/1973 | Fox |
| 3,719,030 A | 3/1973 | Blankemeyer et al. |
| 3,773,111 A | 11/1973 | Dunn |
| 3,853,081 A | 12/1974 | Norris et al. |
| 3,854,219 A | 12/1974 | Staats |
| 3,854,709 A | 12/1974 | Gaw |
| 3,860,086 A | 1/1975 | Mahajan et al. |
| 3,865,022 A | 2/1975 | Ahlrich |
| 3,885,822 A | 5/1975 | Cohen et al. |
| 3,889,390 A | 6/1975 | Klare |
| 3,890,103 A | 6/1975 | Konishi |
| 3,891,496 A | 6/1975 | Erwin |
| 3,895,569 A | 7/1975 | Miller |
| 3,918,412 A | 11/1975 | Lindstrom |
| 3,926,103 A | 12/1975 | Smith |
| 3,928,144 A | 12/1975 | Jakimowicz |
| 3,948,624 A | 4/1976 | Fornoff et al. |
| 3,964,886 A | 6/1976 | Engalitcheff et al. |
| 3,966,563 A | 6/1976 | Armour et al. |
| 3,983,742 A | 10/1976 | Suga |
| 4,010,081 A | 3/1977 | Martt |
| 4,011,101 A | 3/1977 | Levenback et al. |
| 4,018,540 A | 4/1977 | Jackson |
| 4,036,994 A | 7/1977 | Ear |
| 4,066,425 A | 1/1978 | Nett |
| 4,066,596 A | 1/1978 | Stern |
| 4,085,735 A * | 4/1978 | Kaufman ............... B01D 47/06 126/299 E |
| 4,098,616 A | 7/1978 | Dorius et al. |
| 4,117,833 A | 10/1978 | Mueller |
| 4,143,645 A | 3/1979 | Blumberg |
| 4,153,432 A | 5/1979 | Beman et al. |
| 4,157,650 A | 6/1979 | Guibert |
| 4,167,919 A | 9/1979 | Woolley et al. |
| 4,173,924 A | 11/1979 | Bradshaw |
| 4,205,490 A | 6/1980 | Evans |
| 4,231,769 A | 11/1980 | Ahlrich |
| 4,248,141 A | 2/1981 | Miller |
| 4,250,628 A | 2/1981 | Smith et al. |
| 4,266,528 A | 5/1981 | Barnhart et al. |
| 4,273,591 A | 6/1981 | Wood et al. |
| 4,274,845 A | 6/1981 | Howard |
| 4,284,421 A | 8/1981 | Howard |
| 4,287,138 A | 9/1981 | Buckner |
| 4,294,432 A | 10/1981 | Blair et al. |
| 4,318,933 A | 3/1982 | Miller |
| 4,351,652 A | 9/1982 | Wisting |
| 4,363,642 A | 12/1982 | Stahl |
| 4,370,949 A | 2/1983 | Beckett |
| 4,437,867 A | 3/1984 | Lerner |
| 4,466,420 A | 8/1984 | Ernisse et al. |
| 4,471,724 A | 9/1984 | Pope |
| 4,483,316 A | 11/1984 | Fritz et al. |
| 4,484,563 A | 11/1984 | Fritz et al. |
| 4,506,655 A | 3/1985 | Kuechler |
| 4,556,046 A | 12/1985 | Riffel et al. |
| 4,556,772 A | 12/1985 | McCammon et al. |
| 4,563,884 A | 1/1986 | Kunde et al. |
| 4,617,909 A | 10/1986 | Molitor |
| 4,622,819 A | 11/1986 | Draper et al. |
| 4,623,511 A | 11/1986 | Porembski |
| 4,626,346 A | 12/1986 | Hall |
| 4,652,341 A | 3/1987 | Prior |
| 4,667,654 A | 5/1987 | Thaler et al. |
| 4,673,426 A | 6/1987 | Silvestri |
| 4,699,719 A | 10/1987 | Finley |
| 4,738,243 A | 4/1988 | Welsh et al. |
| 4,738,244 A | 4/1988 | Welsh |
| 4,750,454 A | 6/1988 | Santina et al. |
| 4,753,218 A | 6/1988 | Potter |
| 4,759,196 A | 7/1988 | Davis |
| 4,786,250 A | 11/1988 | Cooper et al. |
| 4,803,841 A | 2/1989 | Hargrove et al. |
| 4,813,632 A | 3/1989 | Woodhouse |
| 4,822,385 A | 4/1989 | Strege et al. |
| 4,834,955 A | 5/1989 | Mouche et al. |
| 4,856,493 A | 8/1989 | Fleming et al. |
| 4,859,248 A | 8/1989 | Thaler et al. |
| 4,867,047 A | 9/1989 | Citron |
| 4,877,011 A | 10/1989 | Willice |
| 4,900,341 A | 2/1990 | Csabai |
| 4,903,685 A | 2/1990 | Melink |
| 4,919,696 A | 4/1990 | Higashi et al. |
| 4,921,509 A | 5/1990 | Maclin |
| 4,935,066 A | 6/1990 | Wright |
| 4,936,882 A | 6/1990 | Chen et al. |
| 4,944,782 A | 7/1990 | Rajendran et al. |
| 4,949,472 A | 8/1990 | Arnone |
| 4,955,995 A | 9/1990 | Pontius |
| 5,001,994 A | 3/1991 | Morimoto et al. |
| 5,027,790 A | 7/1991 | Chern |
| 5,050,581 A | 9/1991 | Roehl-Hager et al. |
| 5,207,276 A | 5/1993 | Scofield |
| 5,211,159 A | 5/1993 | Lieblein et al. |
| 5,220,864 A | 6/1993 | Ejiri et al. |
| 5,221,360 A | 6/1993 | Thompson et al. |
| 5,235,963 A | 8/1993 | Strause |
| 5,245,763 A | 9/1993 | Neikter |
| 5,271,161 A | 12/1993 | Joseph |
| 5,413,621 A | 5/1995 | Hogner et al. |
| 5,472,342 A | 12/1995 | Clarke et al. |
| 5,512,312 A | 4/1996 | Forney et al. |
| 5,577,490 A | 11/1996 | Overton |
| 5,618,348 A | 4/1997 | Tran |
| 5,630,367 A | 5/1997 | Kobata et al. |
| 5,639,286 A | 6/1997 | Chen et al. |
| 5,642,784 A | 7/1997 | Guay et al. |
| 5,662,097 A | 9/1997 | Panos |
| 5,718,219 A | 2/1998 | Boudreault |
| 5,733,376 A | 3/1998 | Costello |
| 5,740,785 A | 4/1998 | Dickey et al. |
| 5,787,821 A | 8/1998 | Bhat et al. |
| 5,807,424 A | 9/1998 | Ruiter et al. |
| 5,826,518 A | 10/1998 | Bhat et al. |
| 5,874,292 A | 2/1999 | McMinn |
| 5,941,235 A | 8/1999 | Carter |
| 5,942,142 A | 8/1999 | Forney et al. |
| 5,965,017 A | 10/1999 | Nelson et al. |
| 5,992,152 A | 11/1999 | Weres et al. |
| 6,001,321 A | 12/1999 | Okazoe et al. |
| 6,026,641 A | 2/2000 | Liberty |
| 6,065,546 A | 5/2000 | Uetake et al. |
| 6,068,881 A | 5/2000 | Valley et al. |
| 6,099,808 A | 8/2000 | Miller et al. |
| 6,125,841 A | 10/2000 | Boudreault |
| 6,149,701 A | 11/2000 | Ellingson |
| 6,150,580 A | 11/2000 | Janikowski |
| 6,178,966 B1 | 1/2001 | Breshears |
| 6,182,653 B1 | 2/2001 | Otenbaker et al. |
| 6,216,685 B1 | 4/2001 | Payne |
| 6,223,741 B1 | 5/2001 | Panos |

(56) References Cited

U.S. PATENT DOCUMENTS

| | | |
|---|---|---|
| 6,274,375 B1 | 8/2001 | McMinn |
| 6,323,464 B1 | 11/2001 | Cohn |
| 6,419,448 B1 | 7/2002 | Owczarek |
| 6,511,844 B1 | 1/2003 | Smith |
| 6,534,024 B2 | 3/2003 | Honjo et al. |
| 6,627,166 B1 | 9/2003 | Simon |
| 6,662,800 B2 | 12/2003 | Yeung |
| 6,673,433 B1 | 1/2004 | Saeki et al. |
| 6,698,205 B2 | 3/2004 | Tarelin et al. |
| 6,712,068 B1 | 3/2004 | Yeung |
| 6,733,811 B2 | 5/2004 | Rubio et al. |
| 6,740,224 B1 | 5/2004 | Benavides et al. |
| 6,761,125 B2 | 7/2004 | Kitano et al. |
| 6,776,152 B2 | 8/2004 | Lee |
| 6,802,310 B1 | 10/2004 | Yeung |
| 6,811,591 B2 | 11/2004 | Hay et al. |
| 6,821,318 B2 | 11/2004 | Khosropour |
| 6,851,422 B2 | 2/2005 | Yeung |
| 6,874,497 B2 | 4/2005 | Yeung |
| 6,880,551 B2 | 4/2005 | Yeung |
| 6,895,954 B2 | 5/2005 | Swierczyna et al. |
| 6,895,957 B2 | 5/2005 | Yeung |
| 6,951,191 B1 | 10/2005 | Lin |
| 6,971,842 B2 | 12/2005 | Luniewski et al. |
| 7,056,367 B2 | 6/2006 | Trivett |
| 7,111,622 B2 | 9/2006 | Yeung |
| 7,115,160 B2 | 10/2006 | Fitch et al. |
| 7,166,140 B2 | 1/2007 | Entezarian et al. |
| 7,197,788 B2 | 4/2007 | Yeung |
| 7,210,467 B2 | 5/2007 | Kweon et al. |
| 7,231,893 B2 | 6/2007 | Sundholm |
| 7,273,049 B2 | 9/2007 | Yeung |
| 7,326,286 B2 | 2/2008 | Okada et al. |
| 7,337,613 B2 | 3/2008 | Bellows |
| 7,341,701 B2 | 3/2008 | Abehssera |
| 7,360,534 B2 | 4/2008 | Krupp |
| 7,402,196 B2 | 7/2008 | Allan |
| 7,481,145 B1 | 1/2009 | Turner |
| 7,484,506 B2 | 2/2009 | Besal |
| 7,485,033 B2 | 2/2009 | Baehr et al. |
| 7,537,383 B2 | 5/2009 | Althöfer et al. |
| 7,614,396 B2 | 11/2009 | So |
| 7,637,243 B2 | 12/2009 | Qamhiyeh |
| 7,641,874 B2 | 1/2010 | Cha |
| 7,651,329 B2 | 1/2010 | Okura et al. |
| 7,661,416 B2 | 2/2010 | Sasajima et al. |
| 7,785,068 B2 | 8/2010 | V et al. |
| 7,788,754 B2 | 9/2010 | Piana et al. |
| 7,832,391 B2 | 11/2010 | Kellogg et al. |
| 7,857,882 B1 | 12/2010 | Johnson |
| 7,947,123 B2 | 5/2011 | Kwok et al. |
| 8,012,249 B2 | 9/2011 | Lehman et al. |
| 8,025,713 B2 | 9/2011 | Dou et al. |
| 8,029,230 B2 | 10/2011 | Mizumi et al. |
| 8,056,529 B2 | 11/2011 | Qamhiyeh |
| 8,141,624 B2 | 3/2012 | Martin et al. |
| 8,156,662 B2 | 4/2012 | Carin et al. |
| 8,157,894 B2 | 4/2012 | Kwok et al. |
| 8,161,749 B2 | 4/2012 | Boss et al. |
| 8,230,939 B1 | 7/2012 | Reynolds |
| 8,246,705 B2 | 8/2012 | Bain et al. |
| 2001/0009170 A1 | 7/2001 | Garza-Ondarza et al. |
| 2002/0028501 A1 | 3/2002 | McMinn |
| 2002/0081239 A1 | 6/2002 | Palesch et al. |
| 2002/0088427 A1 | 7/2002 | Chou |
| 2002/0112863 A1 | 8/2002 | Padgett et al. |
| 2002/0127343 A1 | 9/2002 | Kutilek et al. |
| 2003/0008381 A1 | 1/2003 | Augenstein |
| 2003/0037782 A1 | 2/2003 | Yeung |
| 2003/0164309 A1 | 9/2003 | Nakamura et al. |
| 2005/0000509 A1 | 1/2005 | Carter |
| 2005/0016523 A1 | 1/2005 | Yeung |
| 2005/0046052 A1 | 3/2005 | Okada et al. |
| 2005/0150387 A1 | 7/2005 | Has |
| 2005/0178378 A1 | 8/2005 | Marshall et al. |
| 2005/0229921 A1 | 10/2005 | Krupp |
| 2006/0042622 A1 | 3/2006 | Searer |
| 2006/0124444 A1 | 6/2006 | Nakamura et al. |
| 2006/0196498 A1 | 9/2006 | Yeung |
| 2007/0051245 A1 | 3/2007 | Yun |
| 2007/0089731 A1 | 4/2007 | Chang |
| 2007/0119448 A1 | 5/2007 | Yeung |
| 2007/0266590 A1 | 11/2007 | Hehenberger et al. |
| 2008/0000630 A1 | 1/2008 | Haglid |
| 2008/0044889 A1 | 2/2008 | Augenstein |
| 2008/0105620 A1 | 5/2008 | Hicks |
| 2008/0146133 A1 | 6/2008 | Behrens et al. |
| 2008/0184991 A1 | 8/2008 | Krupp |
| 2008/0217444 A1 | 9/2008 | Michalek et al. |
| 2008/0314602 A1 | 12/2008 | Lohnes |
| 2009/0019822 A1 | 1/2009 | Feisthammel et al. |
| 2009/0202688 A1 | 8/2009 | Best |
| 2009/0264060 A1 | 10/2009 | Livchak et al. |
| 2009/0272372 A1 | 11/2009 | Griffin et al. |
| 2009/0301687 A1 | 12/2009 | Watts |
| 2010/0006086 A1 | 1/2010 | Iwamoto |
| 2010/0089240 A1 | 4/2010 | Krichtafovitch |
| 2010/0095949 A1 | 4/2010 | Huang |
| 2010/0139935 A1 | 6/2010 | Reynolds |
| 2010/0143209 A1 | 6/2010 | Cha |
| 2010/0170049 A1 | 7/2010 | Piana et al. |
| 2010/0221162 A1 | 9/2010 | Welp et al. |
| 2010/0229804 A1 | 9/2010 | Okamoto et al. |
| 2010/0318230 A1 | 12/2010 | Liu |
| 2011/0016019 A1 | 1/2011 | Piana et al. |
| 2011/0174384 A1 | 7/2011 | Bagwell et al. |
| 2011/0180100 A1 | 7/2011 | Hafer et al. |
| 2011/0180619 A1 | 7/2011 | Konishi et al. |
| 2011/0232343 A1 | 9/2011 | Mantelatto et al. |
| 2011/0271834 A1 | 11/2011 | Lehman et al. |
| 2011/0284091 A1 | 11/2011 | Livchak et al. |
| 2012/0067021 A1 | 3/2012 | Aggelopoulos |
| 2012/0079946 A1 | 4/2012 | Dold |
| 2012/0183397 A1 | 7/2012 | Mizumi et al. |

FOREIGN PATENT DOCUMENTS

| | | |
|---|---|---|
| CN | 201407718 | 2/2010 |
| CN | 102301187 A | 12/2011 |
| JP | S59136537 U | 9/1984 |
| JP | S59158933 U | 10/1984 |
| JP | H05159174 A | 6/1993 |
| JP | H10318577 A | 12/1998 |
| JP | 2006189225 A | 7/2006 |
| JP | 2006284095 A | 10/2006 |
| JP | 2009534626 A | 9/2009 |
| JP | 2012177498 A | 9/2012 |
| WO | 2010065793 A1 | 6/2010 |
| WO | 2014152760 A2 | 9/2014 |

OTHER PUBLICATIONS

International Search Report and Written Opinion for International Application No. PCT/US2014/027703 dated Sep. 25, 2014.
Office Action in corresponding British Patent Application No. 1516475.9 dated Mar. 22, 2016.
Partial Supplementary European Search Report for European Patent Application No. 14770457.1 dated Nov. 10, 2016.
Australian Examination Report No. 1 issued in Application No. 2014239170 dated May 8, 2017.
Columbian Office Action issued in Application No. 15-226.235 dated Jun. 16, 2017 (with English translation).
European Extended Search Report issued in Application No. 14770457.1 dated Feb. 21, 2017.
International Preliminary Report of Patentability for International Application No. PCT/US2014/027703 dated Sep. 15, 2015.
Office Action for Chinese Patent Application No. 201480025111.6 dated Feb. 13, 2018 with English translation.

(56) References Cited

OTHER PUBLICATIONS

Office Action for Japanese Patent Application No. 2016-502524 dispatched on Feb. 6, 2018 (includes English language translation).

* cited by examiner

WATER SPRAY FUME CLEANSING WITH DEMAND-BASED OPERATION

RELATED APPLICATIONS

The present application claims priority to U.S. Provisional Application No. 61/793,883, entitled "Water Spray Fume Cleansing With Demand-Based Operation," filed Mar. 15, 2013, which is incorporated herein by reference in its entirety.

FIELD

Embodiments relate generally to systems and methods of exhaust ventilation and, more particularly, to controlling a cold water spray system in an exhaust ventilation system for cooking appliances. Embodiments relate to controlling a cold water spray system based on a demand load of a cooking appliance and/or maintaining a low water temperature in the cold water spray system for efficient grease removal in an exhaust ventilation system. Additional embodiments optionally or alternatively relate to controlling and/or activating the cold water spray system to provide a fire safety response based on a high limit exhaust temperature signal and/or an optical fire, smoke, and/or spark sensor signal.

BACKGROUND

Exhaust ventilation systems can be used to remove effluents and air contaminants generated by cooking appliances. These systems are usually equipped with an exhaust hood positioned above the cooking appliance, the hood including a grease filter and an exhaust fan that removes effluents from the area where the cooking appliance is used. Certain exhaust ventilation systems can also function to prevent and/or suppress fires (such as grease fires) occurring on the cooking appliance or in the ventilation system itself. Some exhaust ventilation systems additionally include a cold water spray system to remove grease from the air and/or to clean one or more components of the system.

Efficiency of grease removal and/or cleaning and/or vapor condensation can depend on the temperature and/or dirt content of the water in the cold water spray system. Without reconditioning as to temperature and/or contamination content, the water's value for treating the effluent stream effectively decreases as it is used. For example, as the temperature of the cold water spray increases, the grease removal efficiency decreases. Accordingly, there is a need for maintaining and/or increasing cleaning efficiency of water by replacing or reconditioning, to ensure its effluent treatment competence.

A cold water spray system can also be advantageously used to provide a fire safety response; that is, to help suppress fires in the exhaust ventilation system. However, to provide this functionality, there is a need to accurately detect fires in and/or around the exhaust hood, and for activating the cold water spray system in response to detection of a fire.

SUMMARY

One or more embodiments can include a method of controlling a cold water spray system in an exhaust ventilation system, the exhaust ventilation system including an exhaust hood and the cold water spray system, the cold water spray system including a plurality of cold water spray nozzles. The method comprises determining a demand load of a cooking appliance that generates cooking effluent in a vicinity of the exhaust hood, and determining a temperature of water in the cold water spray system. The method further comprises controlling the cold water spray system in response to at least one of the determined appliance demand load and the determined temperature of water in the cold water spray system to maintain a low temperature of water in the cold water spray system below a predetermined temperature threshold, thereby enabling efficient removal of contaminants from the exhaust hood by the cold water spray system.

In embodiments, the controlling includes spraying water from the cold water spray system when the cooking effluent exceeds a first predetermined out-of-bounds temperature threshold. In embodiments, water is sprayed from nozzles in a cooking hood or a plenum downstream therefrom. Water spray cools the cooling effluent and is collected and circulated to a storage tank for reuse. Embodiments can further include draining water from the storage tank of the cold water spray system or from the cold water spray system by redirecting the drained water while replenishing the drained water from a source of colder water, thereby reducing the temperature of the water. In embodiments, the first predetermined out-of-bounds temperature threshold is between about 80 degrees Fahrenheit and about 90 degrees Fahrenheit. In embodiments, the first predetermined out-of-bounds temperature threshold is about 85 degrees Fahrenheit.

In embodiments, the controlling includes circulating water from a water storage tank of the cold water spray system through a heat exchanger to reduce the temperature of the water, and returning the water to the storage tank. Embodiments can comprise circulating water from the cold water spray system to the heat exchanger when the determined temperature of water in the cold water spray system exceeds a second predetermined out-of-bounds temperature threshold. Embodiments can also comprise attempting to recover a predefined temperature of the water by flowing the water through the heat exchanger and then, upon a failure to recover the predefined temperature, draining the water to a drain and replacing it with replacement water.

Embodiments can further comprise controlling including spraying water through the cold water spray nozzles based on the determined appliance demand load and the determined temperature of water in the cold water spray loop.

Embodiments can further comprise determining the appliance demand load based on one or more sensors that respond to cooking or appliance conditions. In U.S. Patent Application Publication 2011/0284091 to Livchak, et al., hereby incorporated by reference in its entirety herein, the cooking effluent load is predicted by a combination of effluent temperature and radiant temperature of a cooking surface of a cooking appliance. In this system, when the radiant temperature is fluctuating, the controller classifies the cooking appliance as outputting a high cooking effluent load. When the radiant temperature is constant, the cooking appliance is classified as in an idle state. The radiant and cooking effluent temperatures may be combined in this same manner by the controller to classify the cooking load. Then, whether to spray cold water or how much to spray may be determined by the calculated class of the load. When the radiant temperature is above a predefined level and the effluent temperature is above a predefined level, the controller may classify the condition as one indicative of a fire and may spray water at a maximum rate to quench the fire.

The system may be controlled according to two purging or draining temperatures. A first temperature of the water is one in which the water is directly drained from the system.

A second temperature is one that is lower than the first temperature, and where the water is still usable a single time before draining. When the temperature of the water exceeds this second temperature but is lower than the first temperature, the water is sprayed into the cooking effluent stream and afterwards directly drained from the system. In this manner, the heat from the last marginal increase in temperature is not added to the stored tank of water, thereby increasing the efficiency of the system. Note that the term "purge," as used herein, is synonymous with "drain."

In further embodiments, the system may separately or additionally be controlled to maintain a predefined temperature difference between the cold water in the cold water spray loop and the effluent temperature, rather than a predefined absolute temperature. In embodiments, two predefined temperature differences are defined and employed as the above-described absolute first and second temperatures, to control the spraying and draining. That is, the system may be controlled according to two purging or draining temperature differences which are calculated relative to the cooking effluent temperature. A first temperature difference of the water below the cooking effluent temperature is less than a second temperature difference of the water below the cooking effluent temperature. When the temperature of the water is above the cooking effluent temperature minus the first temperature difference, the water is directly drained. When the temperature of the water is above the effluent temperature minus the second temperature but below the effluent temperature minus the first temperature the difference, the water is sprayed and drained thereafter without returning it to the tank while replacing the drained volume with cold water form a source; for example, a fresh water supply. If the temperature of the water is below the effluent temperature minus the second temperature difference, the water is not drained but is returned to the tank.

According to these control methods, the heat from a final marginal increase in temperature is not added to the stored tank of water before the water is replaced, thereby increasing the efficiency of the system. Rather, the last marginal increase in heat goes directly down the drain with the presumably dirty water. Thus, the cooking effluent temperature proximal the exhaust hood is measured, and the cold water spray system is controlled to maintain a predetermined temperature difference between the cooking effluent temperature and the temperature of the water in the cold water spray system, wherein the temperature of the water in the cold water spray system is lower than the cooking effluent temperature. For example, the first predetermined temperature difference may be 10 degrees Fahrenheit and the second temperature difference may be 15 degrees Fahrenheit. The first absolute temperature can be 90 degrees Fahrenheit and the second absolute temperature can be 80 degrees Fahrenheit. Other absolute temperatures and temperature differences are also possible depending on the size of the system and the load intensity, type of cooking process, accessibility of water, etc.

Note that all of the temperature based control techniques can be used with water rehabilitation instead of draining. In such embodiments, instead of draining and replacing water responsively to first and second absolute temperatures and/or draining and replacing responsively to first and second relative temperatures (i.e., temperature differences), water can be rehabilitated by flowing it through a heat exchanger such as a water heater preheater (with activation of fresh potable water flow into the hot water heater), or by cooling the water with a heat exchanger.

Embodiments can further include, additionally or independently, controlling a volume rate of water sprayed through the cold water spray nozzles responsively to the appliance demand load. Embodiments can further include, additionally or independently, spraying water from a storage tank of the cold water spray system through one or more of the plurality of cold water spray nozzles during a predetermined time period to wash the exhaust hood, filters, or ductwork as well as injecting cleaning fluid into the water supply to enhance surface cleaning. Embodiments can further comprise transferring heat from the cold water spray loop to a hot water heater.

Embodiments can further include, additional or independently, controlling the cold water spray system responsively to a fire signal indicating one or more of a threshold temperature of the cooking effluent, a predefined variation range and frequency band of fluctuations of a temperature of the effluent stream, a radiant temperature of a gas or surface, and an indicator of the presence of one or more of fire, smoke, and sparks. Fluctuating temperature in a predefined frequency band may be determined by observing a power spectral density from a band-pass filtered temperature signal, such that a predefined power of the temperature signal within a frequency range indicates a fire. The band and power level may be determined empirically according to the sensitivity and type of fire; for example, grease fires, cooking oil fires, fryer fires, fires due to flammable fouling of the exhaust system, etc.

Other types of temperature signal conditioning may be used to identify and classify fire signatures, including combining effluent stream temperature with radiant temperature, optical characteristics including color and luminance, and frequency characteristics thereof. The presence of the signature may be indicated by the controller as a fire safety signal. The controlling may include receiving the fire safety signal, the fire safety signal including one or more of a high limit exhaust temperature signal and an optical sensor signal, and spraying water through one or more of the plurality of cold water spray nozzles when the received fire safety signal indicates one or more of the temperature of the cooking effluent exceeds a predetermined threshold cooking effluent temperature, and the presence of one or more of fire, smoke, and sparks.

One or more embodiments can include an exhaust ventilation system comprising an exhaust hood, and a cold water spray system including a plurality of spray nozzles associated with the exhaust hood, a water source for providing water to the cold water spray system and for causing water to spray through the spray nozzles, and a water temperature sensor for generating a signal indicative of the temperature of the water in the cold water spray system. The system further comprises a controller configured to determine a demand load of a cooking appliance that generates cooking effluent in a vicinity of the exhaust hood based on signals from one or more sensors proximal to the exhaust hood; determine a temperature of water in the cold water spray system based on the signal from the water temperature sensor; and control the cold water spray system in response to at least one of the determined appliance demand load and the determined temperature of water in the cold water spray system to maintain a low temperature of water in the cold water spray system below a predetermined temperature threshold, thereby enabling efficient removal of contaminants from the exhaust hood by the cold water spray system.

In embodiments, the controller controls the cold water spray system to drain water from the cold water spray system when the determined temperature of water in the cold water spray system exceeds a first predetermined temperature threshold. In embodiments, the controller controls the cold water spray system to reduce the temperature of water from the cold water spray system responsively to determining that the temperature of water in the cold water spray system, indicated by a temperature sensor, exceeds the first predetermined temperature threshold. In embodiments, the controller controls the cold water spray system to filter the water from the cold water spray system responsively to determining that the turbidity of water in the cold water spray system, indicated by a temperature sensor, exceeds a first predetermined turbidity threshold.

In some embodiments the spray nozzles are disposed in the exhaust hood, and in others the spray nozzles are disposed in a plenum downstream of the exhaust hood. The cold water spray system includes a water collection element positioned to collect at least a portion of the water sprayed through the spray nozzles. The water collection element, or fluid circuit connected thereto, has a drain valve for selectively directing the collected water to an outlet. In such embodiments, the controller purges water from the cold water spray system by causing the water source to spray water through the spray nozzles and causing the drain valve to direct the portion of the sprayed water collected in the water collection element to the outlet of the water collection element, to remove the collected portion of the water from the cold water spray system. In further embodiments, the water source includes a water storage tank having a drain valve for selectively draining water from the storage tank to an outlet, and the controller purges water from the cold water spray system by causing the drain valve to drain water from the storage tank. The first predetermined temperature threshold can be between about 80 degrees Fahrenheit and about 90 degrees Fahrenheit. In embodiments, the first predetermined temperature threshold is about 85 degrees Fahrenheit.

In embodiments, the water source includes a water storage tank, and the controller controls the cold water spray system to circulate water by spraying into an effluent stream, capturing the sprayed water in a recovery or collection mechanism such as a funnel, trough, drip pan, bottom of a plenum, etc., and conveying the collected water back to a storage tank from which it is drawn and sprayed again as needed according to a calculated demand based on data from sensors or smart appliances. In embodiments, the spray nozzles are disposed in the exhaust hood, and the cold water spray system comprises a water collection element disposed to collect a portion of the water sprayed through the spray nozzles, the water collection element being in fluid communication with the storage tank. The controller of these embodiments circulates water from the cold water spray system by causing the water source to spray water through the spray nozzles and directing the collected portion of the water to the storage tank.

In further embodiments, the water source comprises a water storage tank, and the cold water spray system comprises a heat exchanger in fluid communication with the storage tank and a pump for circulating water from the storage tank through the heat exchanger and back to the storage tank to reduce the temperature of the water. In these embodiments, the controller is for controlling the pump.

In further embodiments, the controller is for causing the water source to spray water through the spray nozzles based on the determined appliance demand load and the determined temperature of water in the cold water spray loop. In embodiments, one of the sensors proximal to the exhaust hood is a cooking effluent temperature sensor for producing a signal indicative of a cooking effluent temperature, and the controller is for determining the appliance demand load based on the signal from the cooking effluent temperature sensor, and controlling the cold water spray system to maintain a predetermined temperature difference between the cooking effluent temperature and the temperature of the water in the cold water spray system, wherein the temperature of the water in the cold water spray system is lower than the cooking effluent temperature. The predetermined temperature difference can be between about 15 degrees Fahrenheit and about 25 degrees Fahrenheit. In embodiments, the predetermined temperature difference is about 20 degrees Fahrenheit.

In further embodiments, the controller is for causing the water source to adjust an amount of water sprayed through the cold water spray nozzles responsive to the appliance demand load.

In embodiments, the water source includes a water storage tank, and the controller is for causing the water source to spray water from the storage tank through one or more of the plurality of cold water spray nozzles during a predetermined time period to wash the exhaust hood.

Embodiments can comprise at least one of an exhaust temperature sensor for generating a high limit exhaust temperature signal and an optical sensor for generating an optical signal indicative of the presence of one or more of fire, smoke, and sparks. In these embodiments, the controller is for controlling the cold water spray system based on one or more of the high limit exhaust temperature signal and the optical signal; the controlling including causing the water source to spray water through the spray nozzles when the high limit exhaust temperature signal indicates the temperature of the cooking effluent exceeds a predetermined threshold cooking effluent temperature, or the optical signal indicates the presence of one or more of fire, smoke, and sparks. In embodiments, radiant temperature, optical color and luminance, and power in spectral density bands are combined to classify fires and generate a first safety signal for control of the water spray.

In embodiments, the one or more sensors proximal to the exhaust hood include an infrared sensor facing a cooking surface of the cooking appliance for sensing radiant heat from the cooking surface, and a cooking effluent temperature sensor. In further embodiments, the one or more sensors proximal to the exhaust hood include a smoke density opacity sensor for sensing smoke inside the exhaust hood of the cooking appliance, and a cooking effluent temperature sensor.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Disclosed herein are methods and systems for controlling a cold water spray system based on a demand load of a cooking appliance and maintaining a low water temperature in a cold water spray system to provide efficient grease removal in an exhaust ventilation system. Also disclosed herein are methods and systems for controlling a cold water spray system to provide a fire safety response.

Figure 1:
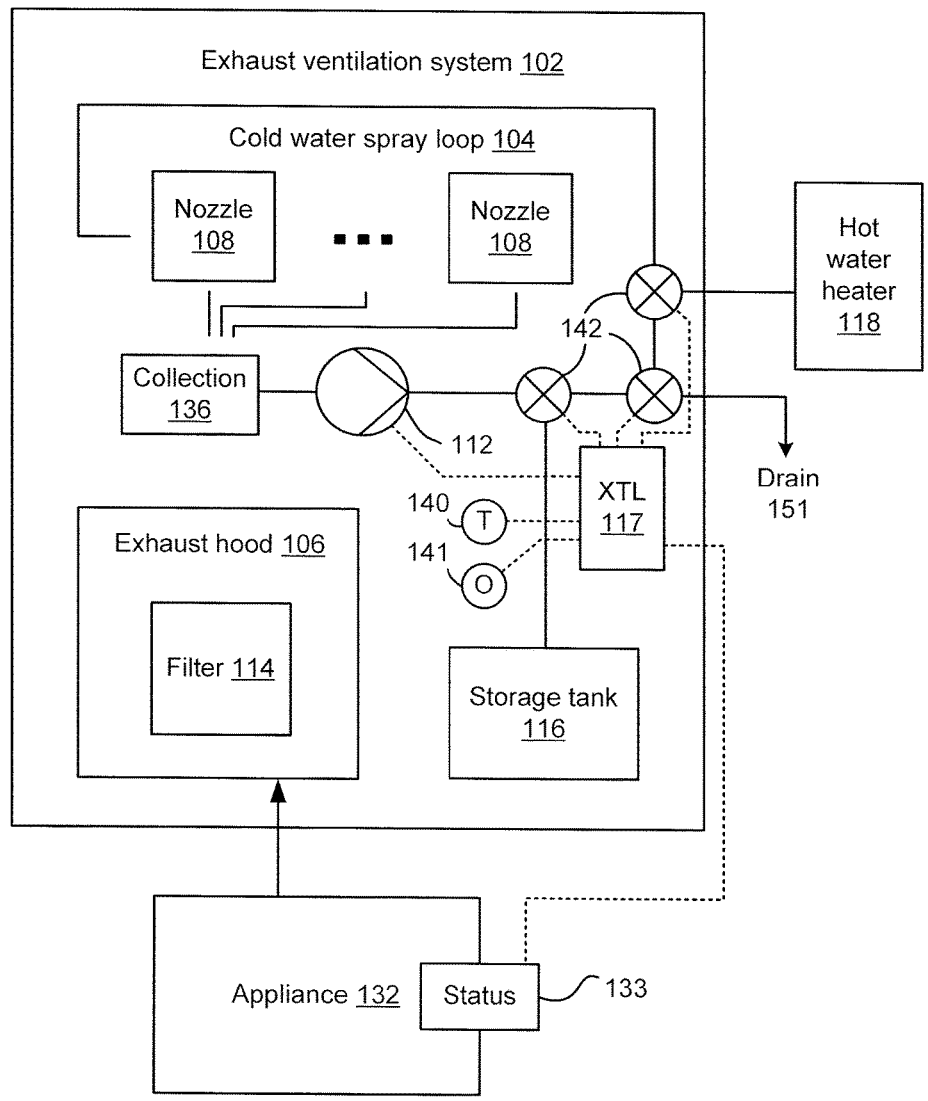
FIG. 1 is a block diagram showing an exemplary exhaust ventilation system according to various embodiments.

FIG. 1 illustrates an exemplary block diagram of a system 100. The system 100 includes an exhaust ventilation system 102 that captures and cleans effluent from a cooking appliance 132 by spraying water into the effluent using a cold water spray loop 104, a device generally known in the art as a scrubber. The appliance 132 may include one or more of cooking grills, stoves, fryers, ovens including conventional and convection ovens, steamers, steam tables, pressure cookers, etc. The appliance may include, or be adapted to include, a status indicator which may be data output from a so-called smart appliance or a sensor which provides status information such as an indication of how high a thermal or fume load is being generated by the appliance. Various devices and methods are known for indicating cooking appliance status including the use of sensors and control system outputs, so the details are not elaborated here. For purposes of the disclosed subject matter, the appliance 132, or sensors arranged with respect to it, may be configured to generate analog or digital signals that indicate the status of the appliance effective for permitting a controller 117 to responsively control the ventilation system 102 to better adapt its cold water spray loop 104 to maintain effective cleaning.

The controller 117 may be adapted for controlling the flow of water in a cold water spray loop 104 responsively to signals that indicate status of the appliance or effluent as well as the condition of the water used to treat the effluent. Various signals may be used, including demand load of a cooking appliance 132 indicated by one or more status indicators 133 such as a sensor or control output of an appliance with an information data connection. In addition, the noted sensors may include effluent temperature or opacity and/or water temperature or turbidity as indicated by respective temperature and/or opacity sensors indicated collectively as reference numerals 140 and 141.

Controller 117 may include a digital or analog type control device of any suitable description. In a preferred embodiment, the controller 117 is as described with reference to FIG. 4. The controller 117 may be configured to control the temperature, water quality, flow rate (including on or off), and non-cleaning uses of the water such as potable hot water preheating using respective control valves 142 and pump(s) 112.

The exhaust ventilation system 102 can include an exhaust hood 106 that may include a primary filter 114 such as an impingement or centrifugal-type grease filter. The exhaust ventilation system 102 includes a cold water spray loop 104 with a plurality of cold water spray nozzles 108. One or more of the plurality of cold water spray nozzles 108 can be directed to spray water onto at least a portion of the filter 114 to clean filter 114. A collection device 136 permits water that is sprayed, but not carried off the by the cooking effluent stream (as vapor or entrained aerosols) to be returned in the cold water spray loop 104. The collection device 136 may be, or include, a run-off tray, funnel, pan, or trough shaped as needed by the physical arrangement of the exhaust ventilation system 102.

A pump 112 can be included in the cold water spray loop 104 to control, and supply motive force to, the flow of water through the cold water spray loop 104. By controlling the speed or on-off status of the pump, the controller 117 can regulate whether water is sprayed on cooking effluent or not, and how much. In embodiments, the cold water spray loop 104 is connected to provide heat to a hot water heater 118, for example, directly or by means of a preheater. A control valve may regulate the flow of water to the hot water heater 118 or the preheater (not shown) responsively to the temperature of water flowing into the hot water heater 118, to the temperature of water in the hot water heater 118, and/or the temperature of the water in the cold water spray loop 104. Advantageously, water in the cold water spray loop 104 is further cooled by delivering heat to the hot water heater 118. The hot water heater 118 can be a tank hot water heater or a direct (on-demand)-type hot water heater. Using the cold water spray loop 104 as a heat source for heating potable water, the system can effectively lower the temperature of the cold water used for effluent treatment (i.e., water circulating in the cold water spray loop), thereby making it more effective for cleaning the effluent stream, and reduce the energy required to raise the temperature of potable water by the hot water heater 118.

In operation, the controller 117 is configured, for example, through programming, to maintain a temperature of water in the cold water spray loop 104 below a predetermined temperature threshold. This may ensure the effectiveness of the water therein for cleaning the cooking effluent. The cold water spray loop 104 can be fitted with one or more sensors 140 that provide a water temperature signal representing a temperature of water in the cold water spray loop 104. To control the temperature of water in the cold water spray loop 104, heat may be directly removed from the water using a heat exchanger as discussed with reference to FIG. 2, infra, or using the interface with the hot water heater 118 as discussed above. In addition, in response to the determined temperature of water in the cold water spray loop 104, the cold water spray loop 104 can also be configured to drain water from the cold water spray loop 104, if the determined temperature of water in the cold water spray loop 104 exceeds a first predetermined temperature threshold. For example, the controller 117 can be configured to control a respective control valve 140 to divert used water to a drain 151 and replace it with fresh water from a fresh water source. The water can be diverted to drain 151 before or after being sprayed (i.e., drained from collection mechanism 136) rather than returned to the storage tank 116, or it can be drained directly from storage tank 116, for example, from a controllable valve on the storage tank 116 (not shown).

In response to the determined temperature of water in the cold water spray loop 104, the cold water spray loop 104 can also be configured to spray and then immediately after collection in collection mechanism 136, drain water from the cold water spray loop 104 instead of returning the water to the storage tank 116 if the determined temperature of water in the cold water spray loop exceeds a second predetermined temperature threshold but not the first, thereby avoiding returning the heat from the last spraying to the storage tank 116. If the water is below either temperature threshold, the water is returned to the tank. If the water exceeds the first temperature threshold it is drained before using it, for example, by flowing it out of the storage tank 116.

Instead of absolute temperature thresholds, temperature difference thresholds may be used which are calculated relative to the effluent stream temperature. That is, the system may be controlled according to two purging or draining temperature differences which are calculated relative to the cooking effluent temperature. A first temperature difference of the water below the cooking effluent temperature is less than a second temperature difference of the water below the cooking effluent temperature. When the temperature of the water is above the cooking effluent temperature minus the first temperature difference, the water is directly drained. When the temperature of the water is above the effluent temperature minus the second temperature but below the effluent temperature minus the first temperature the difference, the water is sprayed and drained thereafter without returning it to the tank while replacing the drained volume with cold water form a source, for example, a fresh water supply. If the temperature of the water is below the effluent temperature minus the second temperature difference, the water is not drained and is returned to the tank.

In embodiments, the exhaust ventilation system 102 can be configured to control the cold water spray loop 104 in response to a demand load of a cooking appliance that generates cooking effluent (smoke, secondary air drawn in by the exhaust system, steam, volatile organics, etc.) in a vicinity of the exhaust hood 106. The exhaust ventilation system 102 may generate a signal indicative of the demand load of the cooking appliance (e.g., from sensor signals or from a data signal from an external source such as a smart appliance) that generates cooking effluent in the vicinity of the exhaust hood 106. In response to the indicated load, water may be pumped through the cold water spray loop 104 to one or more of the plurality of cold water spray nozzles 108. The flow rate may be fixed or varied responsively to the load. For example, the controller may regulate the flow to be proportional, or step-wise proportional, to the load. This may result in the volume of water circulating being at all times proportional to the load. This may result in the volume of water being increased or decreased based on whether the demand load of the cooking appliance increases or decreases. For purposes of these examples, circulation refers to the flow of water from the tank 116 to the spray nozzles 108 to the collection mechanism 126, and back to the storage tank 116. Circulation may also include full or fractional diversion of water to a drain and/or through external heat exchangers, such as for hot water preheating or direct cooling as described with reference to FIG. 2, but not to direct draining of water from the tank 116. Circulation may also refer the direct flow of water from a water source, such as a gray water or potable water source, to the nozzles 108 with or without pumping.

The water spray can be directed at surfaces to clean them. For example, the spray can strike and wash a filter 114 such as a mesh or impingement type filter to remove grease. The water can be selectively injected with a surfactant component to improve the ability to remove oil and volatile organic species from the effluent or from surfaces of ducts or filter or other articles within the exhaust ventilation system 102.

In embodiments, the demand load signal is generated responsively to the cooking effluent temperature in or near the exhaust hood 106. To this end, an algorithm implemented on a digital controller may generate a high load signal when the temperature exceeds a first level. The temperature signal may be combined with radiant temperature to provide multiple fluid load steps, each indicated by the load signal.

To maintain its effectiveness, the ventilation system 102 may be configured to control the flow of water in the cold water spray loop 104 such that the temperature of the water in the cold water spray loop 104 is below the cooking effluent temperature by a predetermined amount. Examples of how temperature regulation may be effected are described above and below and these mechanisms may be regulated under control of the controller 117.

Figure 2:
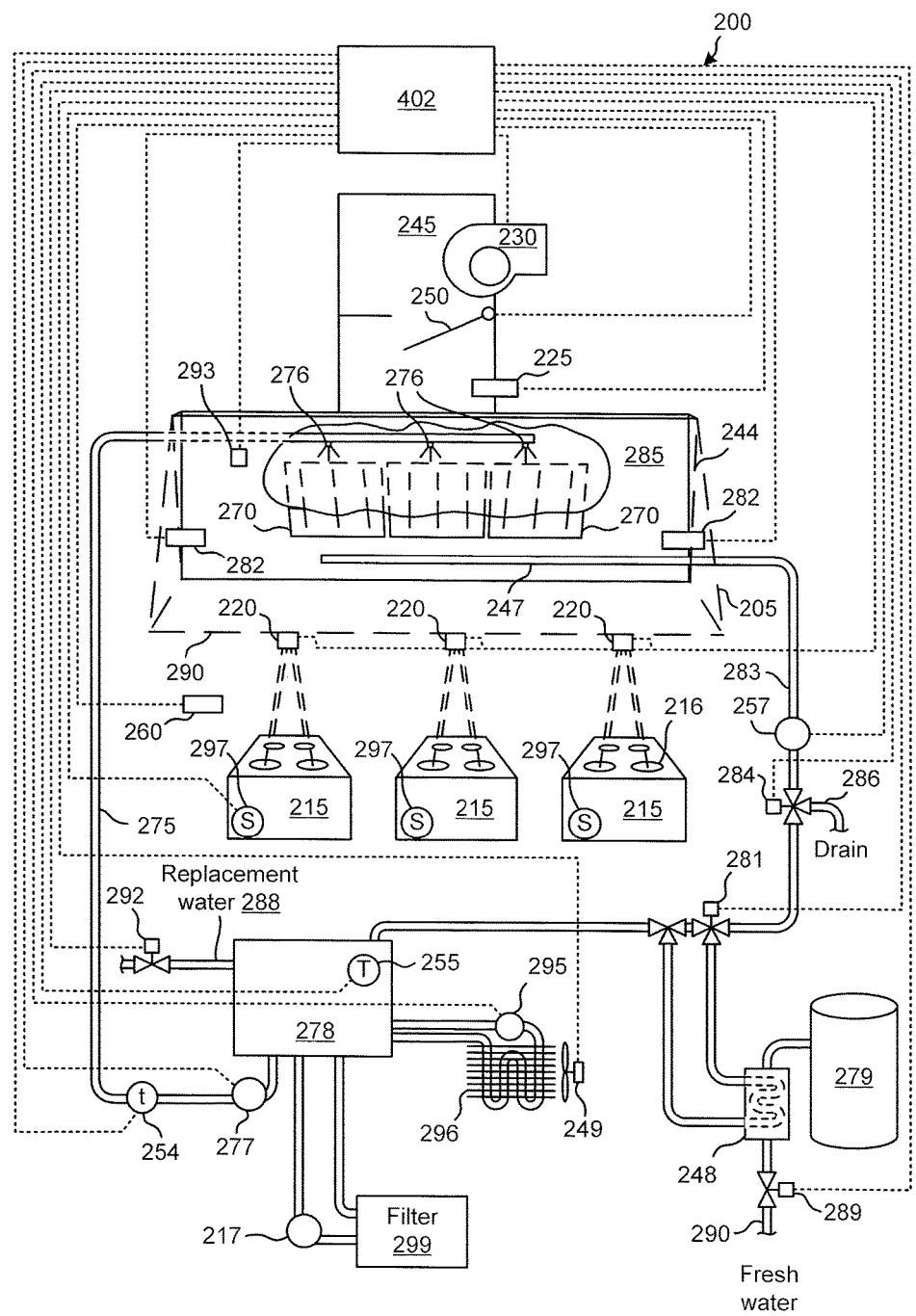
FIG. 2 is a perspective view diagrammatically illustrating an exemplary exhaust ventilating system positioned above a cooking appliance and having a cold water spray loop and control system according to various embodiments.

Referring to FIG. 2, an embodiment of the system of FIG. 1 includes an exhaust ventilation system 200 with an exhaust hood 205 (corresponding to exhaust hood 106) positioned above one or more cooking appliances 215. The exhaust hood 205 has a plenum 244 with primary filters 270, which may be, for example, centrifugal, mesh, or impingement filters. Effluent from the plenum 244 is drawn therethrough to a connected exhaust assembly 245 which draws cooking effluent through the exhaust hood 205. Walls of the hood 205 define an interior volume 285, which communicates with a downwardly facing bottom opening 290 at an end of the hood 205 that is positioned over the cooking appliances 215. The interior volume 285 can also communicate with the exhaust assembly 245 through a primary filter 270. The suction of the exhaust assembly 245 can be generated by a motorized exhaust fan 230, and finally exhausted effluent is vented to the outside environment.

The motorized exhaust fan 230 ultimately draws cooking effluent generated by the cooking appliances 215 into the exhaust assembly 245 (which may include ductwork and flow controls such as a motorized damper 250) which is ultimately expelling effluent into an outside environment. The primary filter 270, which may include multiple cartridges as shown, removes particulates from the effluent stream.

A cold water spray system is provided as a cold water spray loop 275, with spray nozzles 276 in the interior space 285 of the hood 205. At least some of the spray nozzles 276 can be directed spray at least a portion of the filter 270. Cold water spray loop 275 can include a pump 277, a water storage tank 278, a hot water heater 279, and a hood collection element 247 and fluid circuit 283 stemming therefrom to collect water sprayed from the spray nozzles 276. Water can be selectively drained from the system via a drain valve 284 or returned to the storage tank 278. Water can be diverted to hot water heater 279 or a preheater 248 by control diverter valve 281. That is, valve 281 can be provided to direct water from the hood drain 283 to the storage tank 278 or to the hot water heater 279 or preheater 248 as shown. A water temperature sensor positioned anywhere in cold water spray loop 275 can produce a signal indicative of the temperature of the water inside loop 275, for example, the temperature sensor 255 in the tank 278.

Water is circulated by pump 277 through cold water spray loop 275 where it is sprayed from one or more nozzles 276 into the plenum 244. Water cools the effluent and is collected in collection element 247 at the bottom of the plenum 244 and flows back to tank 278. A supplemental pump 257 may be provided to transport recovered water to the tank, but the return flow may be established also by gravity. The flow of water may be diverted or under control of the controller 402 by control valves 284 and 281 and/or allowed to flow under control of control valves 289 and 292. The rate of flow of water in the cold water spray loop 275 may also be regulated by pumps 257 and/or 277 and tapped from the tank 278 by pump 295.

Control valve 284 is configured to divert the flow of water to a drain thereby disposing of water in the cold water spray loop 275 and, potentially, all the water stored in the tank 278. Control valve 281 diverts water from the cold water spray loop 275 to a heat exchanger 248 which preheats fresh water supplied to a hot water heater 279. Control valve 289 may control the flow of fresh water through the heat exchanger. Heat exchanger 248 may be, for example, a crossflow or tube-in-tube heat exchanger. Fluid may also be pumped by pump 295 through a cooling component, an example of which is shown in FIG. 2 as a heat exchanger 296. The latter may be installed in a cool environment such as outdoors and may be equipped with a fan 249. The pump 295 and fan 249 if needed (or optionally a secondary pump configured to pump a cooling fluid rather than air or gas) may be controlled by the controller 402 to extract waste or free cooling effect from the atmosphere or from a heat pump, cold drain water or other source of cooling effect.

As will be evident from the disclosure, embodiments of the exhaust ventilation system 200, shown in FIG. 2, are examples falling generally within at least some of those described above in connection with FIG. 1.

The quality of water circulated in the cold water spray loop 275 can be determined by a temperature sensor, such as one 255 located in the tank 278 and/or a turbidity sensor 254 positioned to detect the turbidity of water in the cold water spray loop 275. Either signal may be used by the controller to determine a below-threshold level of turbidity, or excess temperature, causing the controller to drain and replace the water, divert the water to a filtration plant, or cool the water down, respectively, according to the detected condition of the water.

A demand load indication or signal may be generated by the controller 402 in response to a cooking effluent temperature sensor 225, opacity sensor 282, appliance status, or other indicator of the quantity of cooking effluent (effluent load) from a cooking appliance(s). The controller, in response, may generate a status indicator signal which may combine one or more of these signals or others and use the status indicator signal to generate a control command. For example, the controller 402 may use a lookup table stored in memory and configurable through a user interface to find one or more control commands that correspond to a current range of conditions indicated by the sensors. Although described in terms of an internal status indication, it should be clear that an internal generation of a demand load indication or signal (elsewhere identified as a status indication) may be embodied in the selection of the control signal and need not be separately established as a signal or internal memory state of the controller 402.

Note that, here as in all embodiments, appliance "status" may include information corresponding to the type and amount of food as well as the status of the appliance per se, since these also correspond to the load, which ultimately may be a control variable of interest.

The control module 402 of exhaust ventilation system 200 is operably coupled to, and receives data or analog signals from, a plurality of sensors. The control module 402 generates a signal representing the status of the cooking appliances 215 and controls the cold water spray loop 275 correspondingly. The control module 402 can control the cold water spray loop 275 (i.e., pump 277, valves 281 and 284, etc.) based on some or all of the outputs of the water temperature sensor 255, the cooking effluent temperature sensor 225 positioned on or in the interior of the exhaust duct 210, the output of infrared (IR) radiant temperature sensors 220, each positioned to face the surface of the cooking appliances 215, and smoke density sensors 282. In embodiments, control module 402 also controls the speed of exhaust fan 230 and/or the position of damper 250 based on the appliance status. The appliance status and its acquisition and calculation are discussed below, but note here that appliance status can include a combination of the statuses of one or more appliances from which effluent is exhausted by a single system 200.

A temperature sensor 293 may be positioned in the hood interior to detect a fire. In response to a temperature above a threshold level, the controller 402 may activate the water spray at a predetermined flow rate to generate a large volume flow of water sufficient to quench the fire.

In at least one embodiment, IR sensors 220 can be provided, each one positioned above a respective cooking appliance 215 or portion thereof. Each IR sensor 220 faces a respective cooking surface 215. FIG. 2 illustrates three appliances 215, each with a respective IR sensor, each in turn acquiring radiant temperature of a respective region 216 of the cooking appliances 215. Any number and type of IR sensors 220 and any number of cooking appliances 215 may be used. Also, the radiant temperature of each cooking region 216 may be detected, or each IR sensor 220 may detect an average or other statistic of the aggregate of multiple cooking regions 216.

The control module 402 receives signals from one or more of sensors 225, 220, 282, 255 or status indicator outputs 297 of appliances 215 to determine a demand load of the cooking appliances 215 and generate a cooking appliance's status (e.g., off, idling or cooking) based on the applied data. As mentioned, the determination of a status may not be separate from the generation of a command from the combination of the applied data. Devices such as lookup tables, weighted networks, fuzzy logic, or analog logic or any other known control device may be used to determine a command signal to operate the pumps, valves, fans, etc. described herein.

Figure 3:
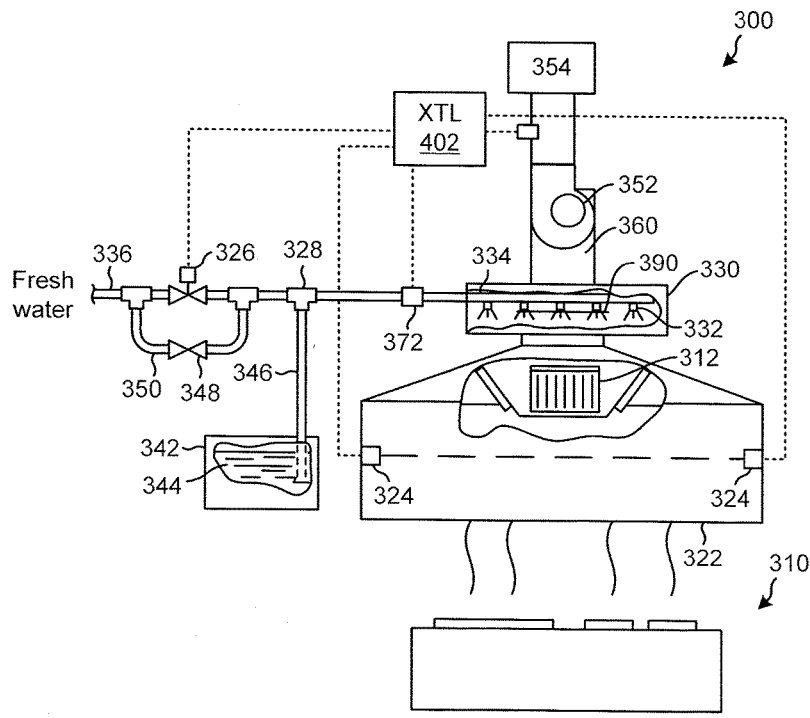
FIG. 3 is a perspective view diagrammatically illustrating another exemplary exhaust ventilating system positioned above a cooking appliance and having a cold water spray system and control system according to various embodiments.

Referring now to FIG. 3, in embodiments, the exhaust hood 106 and the cold water spray nozzles 108 may correspond to an exhaust hood 322 and nozzles 332, respectively, of an exhaust ventilation system 300 shown in FIG. 3. In these embodiments, the demand load may be determined by smoke density opacity sensors 324 that emit a light beam across the length of the exhaust hood 322 and generate an opacity signal due to variations in the magnitude of light received by a luminance sensor thereof.

A canopy exhaust hood 322 above a cooking surface 310 captures emissions from the cooking surface 310. Above a filter 312 and an oxidizer/water scrubber assembly 330, emissions are conducted by a duct 360 to and through a fan 352 and discharged to the atmosphere through an ambient air mixer 354.

Exhaust hood 322 incorporates conventional smoke density opacity sensors 324 that emit a light beam across the length of the exhaust hood 322 longitudinally and over the cooking surface 310. The light beam intensity is diminished due to scattering by emissions from the cooking surface 310. The sensors 324 apply a corresponding signal to a control module 402 to indicate a cooking effluent load of the cooking appliance 310. The control module controls the rate of flow of cold water spray from nozzles 332 in oxidizer/water scrubber assembly 330.

Control module 402 may be configured to operate a solenoid-operated valve 326 to release cold water through an orifice 328 that aspirates a measured amount of oxidizer in the oxidizer/water scrubber 330 through nozzles 332 located on a water manifold or manifolds 334 inside throat of the scrubber 330. The control module 402 can control the cold water spray through nozzles 332 based on some or all of the outputs of the smoke density sensors 324, a water temperature sensor 372, and a cooking effluent temperature sensor 370 positioned on or in the interior of the exhaust duct 360.

The spray nozzles 332 can be served by a water supply line 336 connected to a source of fresh water and regulated pressure, e.g., a city water main. Flow through the water line 336 is controlled by valve 326. The water line 336 can be provided with an aspirator 328. A container 342 of chemical oxidizer 344 such as hydrogen peroxide or sodium hypochlorite solution can communicate with the aspirator 328 by a siphon tube 346 terminating in a venturi orifice, positioned so that the flow of water through the line 336 draws a proportionate amount of concentrated oxidizer through the line 346 and mixes it with the water in the aspirator 328. Thus, the spray emanating from the nozzles 332 includes a water solution containing the chemical oxidizer. A bypass valve 348 can be installed in a line 350 connected in the line 336 upstream and downstream of the valve 326 to bypass solenoid valve 326 and may be used for a continuous operation of spray nozzles 332.

It should also be understood that in embodiments the water supply to nozzles 332 can be replaced with the cold water spray loop 275 of FIG. 2, wherein water is supplied from a tank(s) and some of it returns to the tank(s); and water pressure is supplied by a pump rather than from a source such as a city water main.

Figure 4:
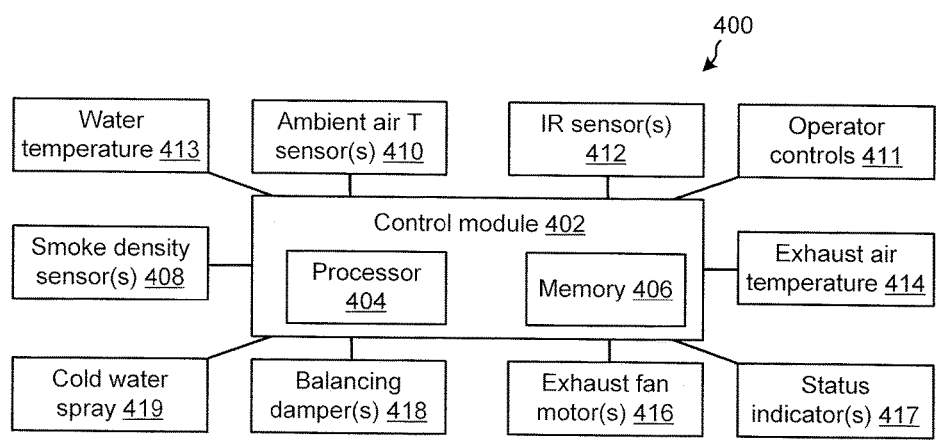
FIG. 4 is a block diagram of an exemplary exhaust control system in accordance with the disclosure.

FIG. 4 shows a schematic block diagram of a control system 400 that can be used in connection with any of the above shown systems (e.g., 200 and 300). As shown in FIG. 4, the exhaust flow control system 400 includes control module 402. The control module 402 includes a processor 404 and a memory 406. The control module 402 is coupled to and receives inputs from a plurality of sensors and devices, which can include an IR sensor 412, which can be positioned on an exhaust hood canopy such as 205 or 322 so that the IR sensor 412 (e.g., corresponding to sensors 220) faces the surface of a cooking appliance such as 215 or 310, and detects the radiant temperature emanating from the cooking surface; smoke density opacity sensors 408 (e.g., corresponding to sensors 282 and 324) mounted inside the exhaust hood; a cold water spray loop water temperature sensor 413 (e.g., corresponding to sensors 255 and 372); a cooking effluent temperature sensor 414 (e.g., corresponding to sensors 225 and 370) installed close to a hood duct such as 210 or 360 to detect the temperature of the cooking effluent that is sucked into the hood duct; an ambient air temperature sensor 410 positioned near the ventilation system to detect the temperature of the air surrounding the cooking appliance 215 or 310 (e.g., corresponding to sensor 260); and operator controls 411.

Inputs from the sensors 408-414 and operator controls 411 are transferred to the control module 402, which then processes the input signals and determines the appliance status and/or demand load. The control module processor 404 can control the speed of the exhaust fan motor(s) 416, and/or the position of the motorized balancing dampers 418, and/or the cold water spray loop 419 based on the appliance demand load and status. Once the control module 402 determines the appliance status, it can then adjust the speed of the exhaust fan 416 speed and the position of the balancing dampers 418 to achieve a predetermined air flow rate associated with the status, and once the control module 402 determines the demand load and water temperature in the cold water spray loop, it can control the cold water spray loop 419, as will be discussed in detail herein below.

In various embodiments, the sensors 408-414 can be operably coupled to the processor 404 using a conductive wire. The sensor outputs can be provided in the form of an analog signal (e.g. voltage, current, or the like). Alternatively, the sensors can be coupled to the processor 404 via a digital bus, in which case the sensor outputs can comprise one or more words of digital information. The number and positions of exhaust temperature sensors 414, radiant temperature sensors (IR sensors) 412, and smoke density sensors 408 can be varied depending on how many cooking appliances and associated hoods, hood collars and hood ducts are present in the system, as well as other variables such as the hood length. The number and positioning of ambient air temperature sensors 410 can also be varied as long as the temperature of the ambient air around the ventilation system is detected. All sensors are exemplary and therefore any known type of sensor may be used to fulfill the desired function. In general, the control module 402 can be coupled to sensors 408-414, the cold water spray loop 419, the motors 416, and dampers 418 by any suitable wired or wireless link.

In various embodiments, multiple control modules 402 can be provided. The type and number of control modules 402 and their location in the system may also vary depending on the complexity and scale of the system as to the number of above enumerated sensors and their locations within a system.

As mentioned above, the control module 402 preferably contains a processor 404 and a memory 406, which can be configured to perform the control functions described herein. In various embodiments the memory 406 can store a list of appropriate input variables, process variables, process control set points as well as calibration set points for each hood. These stored variables can be used by the processor 404 during the different stages of the check, calibration, and start-up functions, as well as during operation of the system.

In various embodiments, the processor 404 can execute a sequence of programmed instructions stored on a computer readable medium (e.g., electronic memory, optical or magnetic storage, or the like). The instructions, when executed by the processor 404, cause the processor 404 to perform the functions described herein. The instructions may be stored in the memory 406, or they may be embodied in another processor readable medium, or a combination thereof. The processor 404 can be implemented using a microcontroller, computer, an Application Specific Integrated Circuit (ASIC), or discrete logic components, or a combination thereof.

In various embodiments, the processor 404 can also be coupled to a status indicator or display device 417, such as, for example, a Liquid Crystal Display (LCD), for output of alarms and error codes and other messages to a user. The indicator 417 can also include an audible indicator such as a buzzer, bell, alarm, or the like.

Figure 5A:
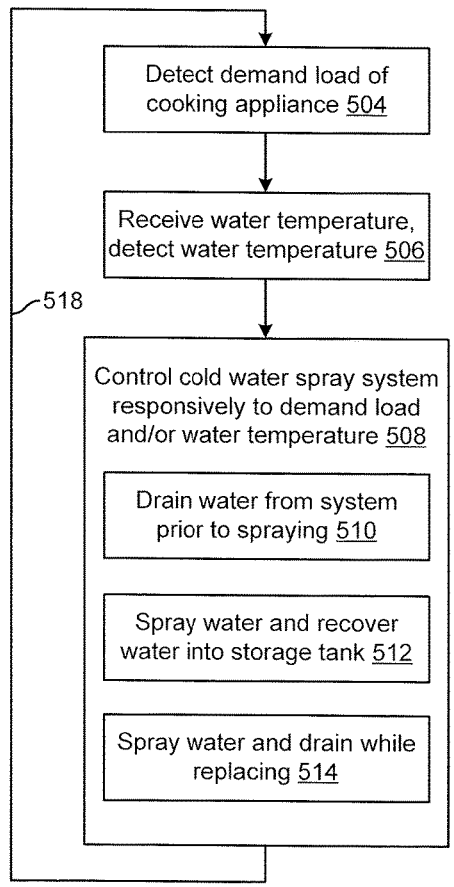
FIG. 5A is a flow chart of an exemplary method of controlling a cold water spray system based on a demand load of a cooking appliance and/or controlling a cold water spray system in an exhaust ventilation system to maintain a low water temperature in the cold water spray system for efficient grease removal.

FIG. 5A is a flow chart of an exemplary method for controlling a cold water spray loop based on a demand load of a cooking appliance and/or controlling a cold water spray loop in an exhaust ventilation system to maintain a low water temperature in the cold water spray loop for efficient grease removal. The method of FIG. 5A can be carried out using the control system 400 and the various sensors and hardware associated therewith.

The method starts at step 502 and continues to step 504. At step 504, the method can determine a demand load of a cooking appliance that generates cooking effluent in a vicinity of the exhaust hood. The demand load can be determined, for example, as disclosed above based on the cooking effluent temperature and the radiant temperature and/or the smoke density opacity sensed using multiple detectors. For example, in one embodiment shown in FIG. 2, the demand load is determined based on the cooking effluent temperature measured by sensor 225, and the radiant temperature measured by IR sensors 220. In another embodiment shown in FIG. 3, the demand load is determined based on the cooking effluent temperature measured by sensor 370, and the smoke density opacity measured by sensors 324. The method continues to step 506.

At step 506, a water temperature signal can be received from the water temperature sensor (e.g., sensor 255 or 372) in the cold water spray system and the water temperature determined. The water temperature signal can represent a temperature of water in the cold water spray system. The method continues to step 508.

At step 508, the cold water spray can be controlled in response to at least one of the appliance demand load and the temperature of water in the cold water spray system, including performing at least one of steps 510, 512, and 514 as follows.

The method can include, at step 510, draining water from the cold water spray system if the determined temperature of water in the cold water spray system exceeds the first predetermined temperature threshold. In certain exemplary embodiments shown in FIG. 2, the pump 277 can cause water from the storage tank 278 to be drained directly.

As in 512, if the temperature of the water in the cold water spray system is below the second predefined temperature, the water is returned to the tank after spraying and collection.

At 514, if the temperature is between the first and second thresholds, the water may be sprayed and collected in the hood drain 283 and directed by a drain valve 284 to be removed from the loop 275 via a drain outlet 286. Alternatively, water can be drained from the storage tank 278 by opening drain valve 284 to drain outlet 286.

As discussed above, the method components 510, 512, and 514 can adapted to employ predefined temperature differences relative to the effluent temperature rather than absolute temperatures.

In embodiments, the amount of water circulated through the cold water spray nozzles can be increased or decreased based on whether the demand load of the cooking appliance(s) increases or decreases. For example, when the cooking appliance(s) is being heavily used and is emitting more grease or other contaminants, the determined demand load will increase because the cooking effluent temperature will increase. Accordingly, the disclosed method will cause the cold water spray system to increase the amount of water circulated through the cold water spray nozzles.

The temperature of the water in the cold water spray loop can be; e.g., about 15 to 25 degrees F. lower than the cooking effluent temperature. This temperature difference is preferably about 20 degrees F.

The water in the cold water spray system can be sprayed, drained, and/or circulated using, for example, a pump 112 or 277 in the case of a cold water spray loop, or by opening the solenoid operated valve 326 if the system is not a loop.

It should be appreciated that the method can be repeated in whole or in part, an example of which is provided as step 518.

It will be appreciated that the method can maintain a low temperature of water in the cold water spray system below a predetermined temperature threshold by performing operations not explicitly shown in FIG. 5A. For example, the method can include circulating water from the storage tank through one or more of the plurality of cold water spray nozzles during a predetermined time period to wash the exhaust hood, or using water in the storage tank as a hot water supply. The method can, for example, include circulating the water in a cold water spray loop into a hot water heater preheater. In this case, referring to FIG. 2, a valve 281 can be set to direct water from the hood drain 283 into the preheater 248 of the hot water heater 279. The method can also improve efficiency of removal of grease or other contaminants by directing one or more of the plurality of cold water spray nozzles to spray at least a portion of the filter(s) 114, 270, 312 included in the exhaust hood.

In further embodiments shown in FIG. 2, the controller 402 is for controlling a pump 295 to circulate water from storage tank 278 through a heat exchanger 296 to cool the water, and then return the water to the storage tank 278. Heat exchanger 296 can be a passive water-to-air heat exchanger such as a radiator, disposed at a location cooler than the environment of the cold water spray loop 275, and can include a fan to aid in heat transfer. In other embodiments, heat exchanger 296 can be an active heat exchanger, such as part of, or in contact with, a refrigeration unit.

Water can be rehabilitated by recovering from out-of-bounds temperature or recovering from out-of-bounds turbidity. Out-of-bounds turbidity can be recovered from by filtering; for example, using a water filter plant 299 connected to tank 278 of FIG. 2, selectively employed to cleanse water in the tank 278 by means of a pump 217. Out-of-bounds temperature can be recovered from by the various cooling mechanisms discussed above. Each of these recovery mechanisms may be effective only a limited number of times or during limited times. For example, the need for cooling effect may not coincide with the demand for hot water, so water properties cannot be recovered using the preheater 248 at all times. In the present method shown in FIG. 5B, the controller 402 steps through multiple mechanisms for recovering the out-of-bounds properties, and then causes water to be drained and replaced if all these mechanisms fail.

Figure 5B:
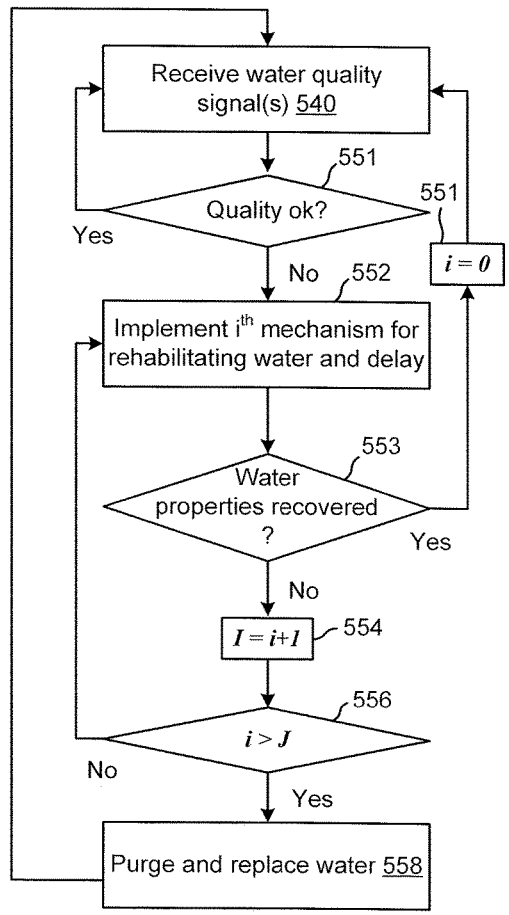
FIG. 5B is a flow chart illustrating a trial method of rehabilitating circulating water of a cold water spray loop according to an embodiment of the disclosed subject matter.

Referring now to FIG. 5B, at step 540, one or more water quality signals are applied to the controller. At 551, the controller determines if the water quality meets the predefined limits. If the water quality is in bounds, control reverts to step 540, otherwise a first mechanism for recovering the water quality is implemented at 552 and, after a delay, the controller determines if the water quality is recovered at 553. If it has, control reverts to step 540 with the reset of the counter at step 551. If water quality has not recovered, the controller increments a counter at step 554 indicating another recovery mechanism is to be tried and operation 552 is repeated for that mechanism. At step 556, the failure of a final Jth mechanism determined by the controller and the water is drained and replaced at step 558. The mechanisms may include filtering water or cooling it using the above-described elements. The priority (ordering per index i) of the mechanisms may be defined within the controller and stored in a memory according to a net economic cost of the mechanism such that lower economic cost mechanisms are used before higher economic cost mechanisms.

Figure 6:
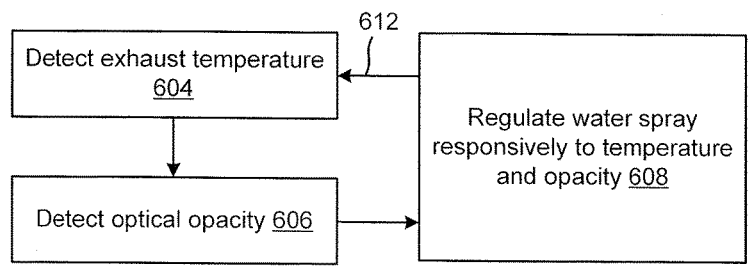
FIG. 6 is a flow chart of an exemplary method of controlling a cold water spray system based on a fire safety signal such as a high limit exhaust temperature signal and/or an optical fire, smoke, and/or spark sensor signal.

FIG. 6 is a flow chart of an exemplary method for controlling a cold water spray system based on a fire safety signal such as a high limit exhaust temperature signal and/or an optical fire, smoke, and/or spark sensor signal. The method of FIG. 6 can be carried out using the control system 400 and the various sensors and hardware associated therewith and described herein above. At step 604, an exhaust temperature signal can be received. The exhaust temperature signal can represent a temperature of exhaust in and/or around an exhaust hood, such as by cooking effluent temperature sensor(s) 414 and/or ambient air temperature sensor(s) 410 described above with reference to FIG. 4. Alternatively, the exhaust temperature signal can indicate a predetermined high limit temperature of exhaust in and/or around the exhaust hood has been met and/or exceeded. The method continues to step 606.

At step 606, an optical signal can be received. The optical signal can represent a signal generated by an optical sensor for detecting the presence of fire, smoke, and/or sparks in and/or around the exhaust hood. The optical sensor can correspond to sensor(s) 408 described above (e.g., smoke density opacity sensors 282 and 324). The method continues to step 608.

At step 608, the method can control the cold water spray system in response to either or both of the exhaust temperature signal and the optical signal to provide a fire safety response. For example, the fire safety response can include activating the cold water spray system in response to receiving a temperature signal indicating that the temperature of exhaust in and/or around the exhaust hood meets or exceeds a predetermined threshold temperature. In an exemplary embodiment of the system shown in FIG. 2, the activation includes using the pump 277 to circulate water through the cold water spray nozzles 276 in response to temperature signals from cooking effluent temperature sensor(s) 225 and/or ambient air temperature sensor(s) 260. In an exemplary embodiment of the system shown in FIG. 3, the activation includes opening the solenoid-operated valve 326 to send water through the cold water spray nozzles 332 in response to signals from cooking effluent temperature sensor 370.

Additionally or alternatively, the fire safety response can include activating the cold water spray system in response to receiving an optical signal indicating the presence of fire, smoke, and/or sparks in and/or around the exhaust hood. In an exemplary embodiment of the system shown in FIG. 2, the activation includes using the pump 277 to circulate water through the cold water spray nozzles 276 in response to signals from smoke density opacity sensors 282. In an exemplary embodiment of the system shown in FIG. 3, the activation includes opening the solenoid-operated valve 326 to send water through the cold water spray nozzles 332 in response to signals from smoke density opacity sensors 324.

It should be appreciated that the method of FIG. 6 can be repeated in whole or in part, as shown by step 612.

It will also be appreciated that in some embodiments, the methods of FIGS. 5A and 6 control the same cold water spray loop.

The methods and systems for maintaining a low water temperature in a cold water spray system disclosed herein and/or the methods and systems for providing a fire safety response can be included in existing exhaust ventilation systems and/or components such as, for example, the Capture Jet™ canopies with Water Wash technology, Models KWF, KWI, UWF, and UWI; and the Cyclo Maze™ Hot/Cold Water Wash Exhaust Hood, Models C-CM-L-MA, C-CM-B, C-CM-B-MA, C-CM-B-T, C-CM-D, C-CM-L, and/or C-CM-L-MA, all of which are available from the Halton Company, Scottsville, Ky., U.S.A.

Embodiments of a method and system for controlling a cold water spray system may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the methods or systems for controlling a cold water spray loop.

Furthermore, embodiments of the disclosed method and system for controlling a cold water spray system may be readily implemented, fully or partially, in software using, for example, object or object-oriented software development environments that provide portable source code that can be used on a variety of computer platforms. Alternatively, embodiments of the disclosed method and system for controlling a cold water spray system can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method and system for controlling a cold water spray system can be implemented in hardware and/or software using any known or later developed systems or structures, devices and/or software by those of ordinary skill in the applicable art from the functional description provided herein and with a general basic knowledge of the computer, exhaust and fluid flow, and/or cooking appliance arts.

Moreover, embodiments of the disclosed method and system for controlling a cold water spray system can be implemented in software executed on a programmed general-purpose computer, a special purpose computer, a microprocessor, or the like. Also, the cold water spray system control method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for controlling a cold water spray system into a software and/or hardware system, such as the hardware and software systems of exhaust vent hoods and/or appliances.

Thus, according to first embodiments of the present disclosure, a method of controlling a cold water spray system in an exhaust ventilation system is provided, the exhaust ventilation system including an exhaust hood and the cold water spray system, the cold water spray system including a plurality of cold water spray nozzles. The method comprises determining a demand load of a cooking appliance that generates cooking effluent in a vicinity of the exhaust hood; determining a temperature of water in the cold water spray system; and controlling the cold water spray system in response to at least one of the determined appliance demand load and the determined temperature of water in the cold water spray system to maintain a low temperature of water in the cold water spray system below a predetermined temperature threshold, thereby enabling efficient removal of contaminants from the exhaust hood by the cold water spray system.

In certain first embodiments, the controlling includes draining water from the cold water spray system when the determined temperature of water in the cold water spray system exceeds a first predetermined out-of-bounds temperature threshold. In further first embodiments, the controlling further includes attempting to recover a predefined temperature of the water by flowing the water through a heat exchanger and then, upon a failure to recover the predefined temperature, draining the water to a drain and replacing it with replacement water. In additional first embodiments, the controlling includes draining water from a storage tank of the cold water spray system. In certain first embodiments, the first predetermined out-of-bounds temperature threshold is between about 80 degrees Fahrenheit and about 90 degrees Fahrenheit.

In some first embodiments, the controlling includes circulating water from the cold water spray system to a heat exchanger when the determined temperature of water in the cold water spray system exceeds a second predetermined out-of-bounds temperature threshold lower than the first predetermined out-of-bounds threshold, and does not exceed the first predetermined out-of-bounds temperature threshold. In further first embodiments, when the determined temperature of water in the cold water spray system exceeds a second predetermined out-of-bounds temperature threshold lower than the first predetermined out-of-bounds temperature threshold and does not exceed the first predetermined out-of-bounds temperature threshold, the controlling includes spraying water through the spray nozzles; collecting a portion of the water in a collection element of the exhaust hood; and draining the collected portion of the water from the cold water spray system. In certain first embodiments, the first predetermined out-of-bounds temperature threshold is about 90 degrees Fahrenheit, and the second predetermined out-of-bounds temperature threshold is about 80 degrees Fahrenheit.

First embodiments also include determining a temperature of the cooking effluent, and draining water from the cold water spray system when the determined temperature of water in the cold water spray system exceeds the determined cooking effluent temperature minus a first predetermined temperature difference; wherein the first predetermined temperature difference is a temperature difference of the water below the cooking effluent temperature. In certain first embodiments, when the determined temperature of water in the cold water spray system exceeds the determined cooking effluent temperature minus a second predetermined temperature difference, and does not exceed the determined cooking effluent temperature minus the first predetermined temperature difference, the controlling includes spraying water through the spray nozzles; collecting a portion of the water in a collection element of the exhaust hood; and draining the collected portion of the water from the cold water spray system, the first predetermined temperature difference being less than the second predetermined temperature difference. In some first embodiments, the first predetermined temperature difference is about 10 degrees Fahrenheit, and the second predetermined temperature difference is about 15 degrees Fahrenheit.

Further first embodiments include circulating water from a water storage tank of the cold water spray system through a heat exchanger to reduce the temperature of the water, and returning the water to the storage tank.

Further first embodiments include spraying water through the cold water spray nozzles based on the determined appliance demand load and the determined temperature of water in the cold water spray loop. In some first embodiments, the appliance demand load is determined responsive to a cooking effluent temperature proximal the exhaust hood; and the cold water spray system is controlled to maintain a predetermined temperature difference between the cooking effluent temperature and the temperature of the water in the cold water spray system, where the temperature of the water in the cold water spray system is lower than the cooking effluent temperature. In certain first embodiments, the predetermined temperature difference is between about 15 degrees Fahrenheit and about 25 degrees Fahrenheit. In other first embodiments, the predetermined temperature difference is about 20 degrees Fahrenheit.

Some first embodiments include controlling an amount of water sprayed through the cold water spray nozzles responsive to the appliance demand load.

Further first embodiments comprise spraying water from a storage tank of the cold water spray system through one or more of the plurality of cold water spray nozzles during a predetermined time period to wash the exhaust hood.

In further first embodiments, the controlling comprises spraying water through the spray nozzles; collecting a portion of the water in a collection element of the exhaust hood; and directing the collected portion of the water through a water preheater of a hot water heater. Certain first embodiments include returning the collected water to a storage tank of the cold water spray system after it passes through the water preheater.

In further first embodiments, the controlling comprises spraying water through the spray nozzles; collecting a portion of water in a collection element of the exhaust hood; detecting a water quality of the collected portion; responsive to a detected out-of-bounds water quality, implementing at least two water quality recovery schemes, each including one of filtering and transferring heat out of the collected water; and draining the collected water from the cold water spray system and replacing the collected water if the at least two quality recovery schemes fail to recover the water quality.

In some first embodiments, the method further comprises controlling the cold water spray system based on a fire safety signal representing one or more of a temperature of the cooking effluent and an indicator of the presence of one or more of fire, smoke, and sparks. The controlling includes receiving the fire safety signal, the fire safety signal including one or more of a high limit exhaust temperature signal and an optical sensor signal; and spraying water through one or more of the plurality of cold water spray nozzles when the received fire safety signal indicates one or more of the temperature of the cooking effluent exceeds a predetermined threshold cooking effluent temperature, and the presence of one or more of fire, smoke, and sparks.

In certain first embodiments, the fire safety signal includes an indication of a fluctuating temperature in a predefined frequency band, based on a power spectral density from a band-pass filtered temperature signal, such that a predefined power of the temperature signal within a frequency range indicates a fire. In some first embodiments, the fire safety signal includes a conditioned temperature signal including at least one of a combination of effluent stream temperature with radiant temperature, optical characteristics including color and luminance, and frequency characteristics thereof.

In second embodiments of the present disclosure, an exhaust ventilation system comprises an exhaust hood, a cold water spray system including a plurality of spray nozzles associated with the exhaust hood, a water source for providing water to the cold water spray system and for causing water to spray through the spray nozzles, and a water temperature sensor for producing a signal indicative of the temperature of the water in the cold water spray system; and a controller. The controller is configured to determine a demand load of a cooking appliance that generates cooking effluent in a vicinity of the exhaust hood based on signals from one or more sensors proximal to the exhaust hood; determine a temperature of water in the cold water spray system based on the signal from the water temperature sensor; and control the cold water spray system in response to at least one of the determined appliance demand load and the determined temperature of water in the cold water spray system to maintain a low temperature of water in the cold water spray system below a predetermined temperature threshold, thereby enabling efficient removal of contaminants from the exhaust hood by the cold water spray system.

According to certain second embodiments, the controller is for controlling the cold water spray system to drain water from the cold water spray system when the determined temperature of water in the cold water spray system exceeds a first predetermined out-of-bounds temperature threshold. In some second embodiments, the water source comprises a storage tank and a heat exchanger in fluid communication with the storage tank and a pump for circulating water from the storage tank through the heat exchanger and back to the storage tank to reduce the temperature of the water; and the controller is for attempting to recover a predefined temperature of the water by causing the pump to flow the water through the heat exchanger and then, upon a failure to recover the predefined temperature, draining the water from the cold water spray system and replacing it with replacement water. In further second embodiments, the controller is for draining water from a storage tank of the water source. In some second embodiments, the first predetermined out-of-bounds temperature threshold is between about 80 degrees Fahrenheit and about 90 degrees Fahrenheit.

According to further second embodiments, the water source comprises a storage tank, a heat exchanger in fluid communication with the storage tank, and a pump for circulating water from the storage tank through the heat exchanger and back to the storage tank to reduce the temperature of the water. The controller is for controlling the pump to circulate water to the heat exchanger when the determined temperature of water in the cold water spray system exceeds a second predetermined out-of-bounds temperature threshold lower than the first predetermined out-of-bounds threshold, and does not exceed the first predetermined out-of-bounds temperature threshold.

In some second embodiments, the cold water spray system comprises a water collection element disposed to collect a portion of the water sprayed through the spray nozzles, and the controller is for causing water to spray through the spray nozzles and draining the collected portion of the water from the cold water spray system when the determined temperature of water in the cold water spray system exceeds a second predetermined out-of-bounds temperature threshold lower than the first predetermined out-of-bounds threshold, and does not exceed the first predetermined out-of-bounds temperature threshold.

According to some second embodiments, the first predetermined out-of-bounds temperature threshold is about 90 degrees Fahrenheit, and the second predetermined out-of-bounds temperature threshold is about 80 degrees Fahrenheit.

In further second embodiments, one of the sensors proximal to the exhaust hood is for determining a temperature of the cooking effluent, and the controller is for controlling the cold water spray system to drain water from the cold water spray system when the determined temperature of water in the cold water spray system exceeds the determined cooking effluent temperature minus a first predetermined temperature difference. The first predetermined temperature difference is a temperature difference of the water below the cooking effluent temperature.

In some second embodiments, the cold water spray system comprises a water collection element disposed to collect a portion of the water sprayed through the spray nozzles, and the controller is for causing water to spray through the spray nozzles and draining the collected portion of the water from the cold water spray system when the determined temperature of water in the cold water spray system exceeds the determined cooking effluent temperature minus a second predetermined temperature difference, and does not exceed the determined cooking effluent temperature minus the first predetermined temperature difference.

According to certain second embodiments, the first predetermined temperature difference is about 10 degrees Fahrenheit, and the second predetermined temperature difference is about 15 degrees Fahrenheit.

In some second embodiments, the water source comprises a storage tank, a heat exchanger in fluid communication with the storage tank, and a pump for circulating water from the storage tank through the heat exchanger and back to the storage tank to reduce the temperature of the water, and the controller is for controlling the pump.

In some second embodiments, the controller is for spraying water through the cold water spray nozzles based on the determined appliance demand load and the determined temperature of the water in the cold water spray loop.

In certain second embodiments, one of the sensors proximal to the exhaust hood is for determining a temperature of the cooking effluent. The controller is for controlling the cold water spray system to maintain a predetermined temperature difference between the cooking effluent temperature and the temperature of the water in the cold water spray system, the temperature of the water in the cold water spray system being lower than the cooking effluent temperature. In some second embodiments, the predetermined temperature difference is between about 15 degrees Fahrenheit and about 25 degrees Fahrenheit. In some second embodiments, the predetermined temperature difference is about 20 degrees Fahrenheit.

According to second embodiments, the controller is for causing the water source to spray water through the spray nozzles based on the determined appliance demand load.

According to further second embodiments, the water source includes a water storage tank, and the controller is for causing the water source to spray water from the storage tank through one or more of the plurality of cold water spray nozzles during a predetermined time period to wash the exhaust hood.

In further second embodiments, the cold water spray system comprises a hot water heater, and the controller is for causing the cold water spray system to cool the water by passing the water through a heat exchanger associated with the hot water heater, thereby transferring heat to the hot water heater.

In some second embodiments, the cold water spray system comprises a water collection element disposed to collect a portion of the water sprayed through the spray nozzles, and a turbidity sensor for generating a water quality signal, and the water source comprises a water storage tank, a water filter plant fluidly connected to the storage tank, and a pump for circulating water from the tank to the filter plant and back to the storage tank. The controller is for causing water to spray through the spray nozzles, detecting a water quality of the collected portion based on the water quality signal, responsive to a detected out-of-bounds water quality, implementing at least two water quality recovery schemes, each including one of filtering and transferring heat out of the collected water; and draining the collected water from the cold water spray system and replacing the collected water if the at least two quality recovery schemes fail to recover the water quality.

Further second embodiments comprise at least one of an exhaust temperature sensor for generating a high limit exhaust temperature signal and an optical sensor for generating an optical signal indicative of the presence of one or more of fire, smoke, and sparks. The controller is for controlling the cold water spray system based on one or more of the high limit exhaust temperature signal and the optical signal. The controlling includes causing the water source to spray water through the spray nozzles when the high limit exhaust temperature signal indicates the temperature of the cooking effluent exceeds a predetermined threshold cooking effluent temperature, or the optical signal indicates the presence of one or more of fire, smoke, and sparks.

In further second embodiments, the one or more sensors proximal to the exhaust hood include an infrared sensor facing a cooking surface of the cooking appliance for sensing radiant heat from the cooking surface, and a cooking effluent temperature sensor. In some second embodiments, the one or more sensors proximal to the exhaust hood include a smoke density opacity sensor for sensing smoke inside the exhaust hood of the cooking appliance, and a cooking effluent temperature sensor.

In third embodiments of the present disclosure, an exhaust ventilation system comprises an exhaust hood, a cold water spray system including a plurality of spray nozzles located inside an exhaust system connected with the exhaust hood to draw cooking effluent therethrough, and at least one cooling element adapted to cool or replace water in the cold water spray system. The cooling element can be a hot water heater, a preheater connected to a hot water heater, a replacement supply of water, a water drain, one or more diverter control valves, one or more flow control valves, and a heat exchanger connected to an external source of cooling effect. The exhaust ventilation system further comprises a water source connected to supply water to the cold water spray system and for causing water to spray through the spray nozzles, a water temperature sensor for producing a signal indicative of the temperature of the water in the cold water spray system, and a controller. The controller is configured to detect a demand load of a cooking appliance that generates cooking effluent in a vicinity of the exhaust hood; determine a temperature of water in the cold water spray system based on the signal from the water temperature sensor; and control the at least one cooling element to reduce the temperature of water in the cold water spray system in response to at least one of the determined appliance demand load and the temperature of water in the cold water spray system to maintain a predefined temperature of water in the cold water spray system.

In certain third embodiments, the controller controls at least one control valve or diverter valve of the cold water spray system to drain water from the cold water spray system and replace the drained water responsively to the temperature of water in the cold water spray system. In some third embodiments, the spray nozzles are disposed in the exhaust hood or a plenum attached thereto, and the cold water spray system includes a water collection element disposed to collect a portion of the water sprayed through the spray nozzles, the water collection element having a drain flow control valve for selectively directing the collected water to an outlet. The controller controls the drain flow control valve to drain water from the cold water spray system by causing the water source to spray water through the spray nozzles and causing the drain valve to direct the portion of the sprayed water collected in the hood drain to the outlet of the water collection element, to remove the collected portion of the water from the cold water spray system.

According to further third embodiments, the cold water spray system includes a heat exchanger and at least one diverter control valve which is controlled by the controller to flow water flowing in the water spray system through the heat exchanger, the heat exchanger being connected to a source of cooling effect, whereby the water used for the water spray system is cooled. In some third embodiments, the controller controls the diverter control valve responsively to the water temperature sensor.

According to further third embodiments, the water spray system includes a hot water preheater and at least one diverter control valve which is controlled by the controller to flow water flowing in the water spray system through the hot water preheater, whereby the water used for the water spray system is cooled and water flowing to a hot water heater is preheated. In some third embodiments, the controller controls the diverter valve responsively to the water temperature sensor. In some third embodiments, the controller is configured to control a flow of fresh water to the hot water heater, which fresh water is preheated by the preheater as it flows to the hot water heater.

In some third embodiments, the cold water spray system includes a drain flow control valve that selectively directs water flowing therein to a drain and a flow control valve that directs replacement water into the cold water spray system, and the controller includes at least one of a temperature sensor and a turbidity sensor. The controller is configured to drain and replace water in the cold water spray system responsively to a signal from the at least one of the temperature and turbidity sensors so as to maintain at least one of a minimum temperature and a minimum cleanness of the water in the cold water spray system. In certain third embodiments, the controller drains water above 80 degrees Fahrenheit.

In further third embodiments, the controller controls the flow of water to cool the water when it reaches 80 degrees Fahrenheit. In some third embodiments, the controller drains water above 90 degrees Fahrenheit. In certain third embodiments, the controller controls the flow of water to cool the water when it reaches 90 degrees Fahrenheit. In some third embodiments, the controller drains water above 85 degrees Fahrenheit. In further third embodiments, the controller controls the flow of water to cool the water when it reaches 85 degrees Fahrenheit.

According to certain third embodiments, the controller steps through multiple ways of cooling the water in the cold water spray loop.

According to further third embodiments, the spray nozzles are disposed in the exhaust hood or in an exhaust plenum and the cold water spray system includes a collection mechanism to collect a portion of the water sprayed through the spray nozzles, the collection mechanism being in fluid communication with the storage tank. The controller drains water from the cold water spray system by draining the water from the storage tank.

In further third embodiments, the controller detects water quality and responsive to a detected out-of-bounds water quality, implements at least two water quality recovery schemes each including one of filtering and transferring heat out of the water, prior to draining and replacing the water if the at least two quality recovery schemes fail to recover the water quality.

It is, therefore, apparent that there is provided in accordance with the present disclosure, methods and systems for controlling a cold water spray system. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method of controlling a cold water spray system in an exhaust ventilation system, the exhaust ventilation system including an exhaust hood and the cold water spray system, the cold water spray system including a plurality of cold water spray nozzles, the method comprising:
    determining a demand load of a cooking appliance that generates cooking effluent that is captured by the exhaust hood;
    determining a temperature of water in the cold water spray system; and
    controlling the cold water spray system in response to at least one of the determined demand load of the cooking appliance and the determined temperature of water in the cold water spray system to maintain a low temperature of water in the cold water spray system below a predetermined temperature threshold, thereby enabling removal of contaminants from the exhaust hood by the cold water spray system, wherein
    the controlling includes draining water from the cold water spray system when the determined temperature of water in the cold water spray system exceeds a first predetermined out-of-bounds temperature threshold.

2. The method of claim 1, wherein the controlling further includes:
    attempting to recover a predefined temperature of the water by flowing the water through a heat exchanger and then, upon a failure to recover the predefined temperature, draining the water to a drain and replacing it with replacement water.

3. The method of claim 1, wherein the controlling includes draining water from a storage tank of the cold water spray system.

4. The method of claim 1, wherein the first predetermined out-of-bounds temperature threshold is between about 80 degrees Fahrenheit and about 90 degrees Fahrenheit.

5. The method of claim 1, wherein the controlling includes circulating water from the cold water spray system to a heat exchanger when the determined temperature of water in the cold water spray system exceeds a second predetermined out-of-bounds temperature threshold lower than the first predetermined out-of-bounds temperature threshold, and does not exceed the first predetermined out-of-bounds temperature threshold.

6. The method of claim 5, wherein the first predetermined out-of-bounds temperature threshold is about 90 degrees Fahrenheit, and the second predetermined out-of-bounds temperature threshold is about 80 degrees Fahrenheit.

7. The method of claim 1, wherein when the determined temperature of water in the cold water spray system exceeds a second predetermined out-of-bounds temperature threshold lower than the first predetermined out-of-bounds temperature threshold and does not exceed the first predetermined out-of-bounds temperature threshold, the controlling includes:
    spraying water through the spray nozzles;
    collecting a portion of the water in a collection element of the exhaust hood; and
    draining the collected portion of the water from the cold water spray system.

8. The method of claim 1, wherein the controlling includes circulating water from a water storage tank of the cold water spray system through a heat exchanger to reduce the temperature of the water, and returning the water to the water storage tank.

9. The method claim 1, wherein the controlling includes spraying water through the cold water spray nozzles based on the determined demand load of the cooking appliance and the determined temperature of water in the cold water spray system.

10. The method of claim 9, further comprising:
    controlling the cold water spray system to maintain a predetermined temperature difference between temperature of the cooking effluent and the temperature of the water in the cold water spray system, wherein the temperature of the water in the cold water spray system is lower than the temperature of the cooking effluent.

11. The method of claim 10, wherein the predetermined temperature difference is between about 15 degrees Fahrenheit and about 25 degrees Fahrenheit.

12. The method of claim 11, wherein the predetermined temperature difference is about 20 degrees Fahrenheit.

13. The method of claim 1, comprising controlling an amount of water sprayed through the cold water spray nozzles responsive to the demand load of the cooking appliance.

14. The method of claim 1, comprising spraying water from a storage tank of the cold water spray system through one or more of the plurality of cold water spray nozzles during a predetermined time period to wash the exhaust hood.

15. The method of claim 1, wherein the controlling comprises:
spraying water through the spray nozzles;
collecting a portion of the water in a collection element of the exhaust hood; and directing the collected portion of the water through a water preheater of a hot water heater.

16. The method of claim 15, further comprising;
returning the water that has been collected in the collection element to a storage tank of the cold water spray system after it passes through the water preheater.

17. The method of claim 1, further comprising:
controlling the cold water spray system based on a fire safety signal representing one or more of a temperature of the cooking effluent and an indicator of the presence of one or more of fire, smoke, and sparks;
the controlling including:
receiving the fire safety signal, the fire safety signal including one or more of a high limit exhaust temperature signal and an optical sensor signal; and
spraying water through one or more of the plurality of cold water spray nozzles when the received fire safety signal indicates one or more of:
the temperature of the cooking effluent exceeds a predetermined threshold cooking effluent temperature, and
the presence of one or more of fire, smoke, and sparks.

18. The method of claim 17, wherein the fire safety signal includes an indication of a fluctuating temperature in a predefined frequency band, based on a power spectral density from a band-pass filtered temperature signal, such that a predefined power of the band-pass filtered temperature signal within the predefined frequency band indicates a fire.

19. The method of claim 17, wherein the fire safety signal includes a conditioned temperature signal including at least one of a combination of effluent stream temperature with radiant temperature, optical characteristics including color and luminance, and frequency characteristics thereof.

20. A method of controlling a cold water spray system in an exhaust ventilation system, the exhaust ventilation system including an exhaust hood and the cold water spray system, the cold water spray system including a plurality of cold water spray nozzles, the method comprising:
determining a demand load of a cooking appliance that generates cooking effluent that is captured by the exhaust hood;
determining a temperature of water in the cold water spray system;
controlling the cold water spray system in response to at least one of the determined demand load of the cooking appliance and the determined temperature of water in the cold water spray system to maintain a low temperature of water in the cold water spray system below a predetermined temperature threshold, thereby enabling removal of contaminants from the exhaust hood by the cold water spray system; and
determining a temperature of the cooking effluent, wherein
the controlling includes draining water from the cold water spray system when the determined temperature of water in the cold water spray system exceeds the determined cooking effluent temperature minus a first predetermined temperature difference value; and
wherein the first predetermined temperature difference value is a temperature difference between the temperature of the water and the cooking effluent temperature.

21. The method of claim 20, wherein when the determined temperature of water in the cold water spray system exceeds the determined cooking effluent temperature minus a second predetermined temperature difference value, and does not exceed the determined cooking effluent temperature minus the first predetermined temperature difference value, the controlling includes:
spraying water through the spray nozzles;
collecting a portion of the water in a collection element of the exhaust hood; and
draining the collected portion of the water from the cold water spray system;
wherein the first predetermined temperature difference value is less than the second predetermined temperature difference value.

22. The method of claim 21, wherein the first predetermined temperature difference value is about 10 degrees Fahrenheit, and the second predetermined temperature difference value is about 15 degrees Fahrenheit.

23. A method of controlling a cold water spray system in an exhaust ventilation system, the exhaust ventilation system including an exhaust hood and the cold water spray system, the cold water spray system including a plurality of cold water spray nozzles, the method comprising:
determining a demand load of a cooking appliance that generates cooking effluent that is captured by the exhaust hood;
determining a temperature of water in the cold water spray system; and
controlling the cold water spray system in response to at least one of the determined demand load of the cooking appliance and the determined temperature of water in the cold water spray system to maintain a low temperature of water in the cold water spray system below a predetermined temperature threshold, thereby enabling removal of contaminants from the exhaust hood by the cold water spray system, wherein the controlling comprises:
spraying water through the spray nozzles;
collecting a portion of water in a collection element of the exhaust hood;
detecting a water quality of the collected portion;
responsive to a detected out-of-bounds water quality, implementing at least two water quality recovery schemes, each including one of filtering and transferring heat out of the collected water; and
draining the collected water from the cold water spray system and replacing the collected water if the at least two quality recovery schemes fail to recover the water quality to not be of the out-of-bounds water quality.

* * * * *